United States Patent [19]

Griffin

[11] Patent Number: 4,897,719
[45] Date of Patent: Jan. 30, 1990

[54] IMAGE PRE-PROCESSING SUB-SYSTEM
[76] Inventor: Hugh Griffin, R.R. #5, Box 410, Greenfield, Ind. 46140
[21] Appl. No.: 27,734
[22] Filed: Mar. 19, 1987
[51] Int. Cl.⁴ .............................................. H04N 7/12
[52] U.S. Cl. ..................................... 358/135; 250/578
[58] Field of Search ................... 358/213.11, 212, 209, 358/133, 135, 260, 261.3, 280, 282, 443, 426, 464; 360/9.1; 250/578; 364/515, 517

[56] References Cited
U.S. PATENT DOCUMENTS
4,365,273 12/1982 Yamada et al. ...................... 358/260

Primary Examiner—L. T. Hix
Assistant Examiner—David M. Gray
Attorney, Agent, or Firm—Barnes & Thornburg

[57] ABSTRACT

An image pre-processing sub-system providing very high speed image data evaluation to supply condensed, real time boundary linkage data to a controlling computer of an operational system. The sub-system provides for an electronic video camera capable of the operations on an image of aiming, magnifying, and rotationally orienting. The camera direction, magnification and orientation control from the system computer results from visual image processed feedback from the image pre-processor with user tailored software providing the desired responses. Dual sub-systems, or a single sub-system at two sequentially different locations, provides triangulation information necessary for high speed distance measurements of objects from the camera. Visual data, detected by the camera, are processed to locate image boundaries, to filter noise, to enhance the boundary, to provide linkage boundary information, to provide texture data, and to provide shades of gray data to the computer in a condensed form. The sub-system adjustable magnification and rotation capability, of selected sub-areas of the full image, permit very high resolution image evaluation compatible with template matching techniques for object identification or inspection operations.

14 Claims, 23 Drawing Sheets

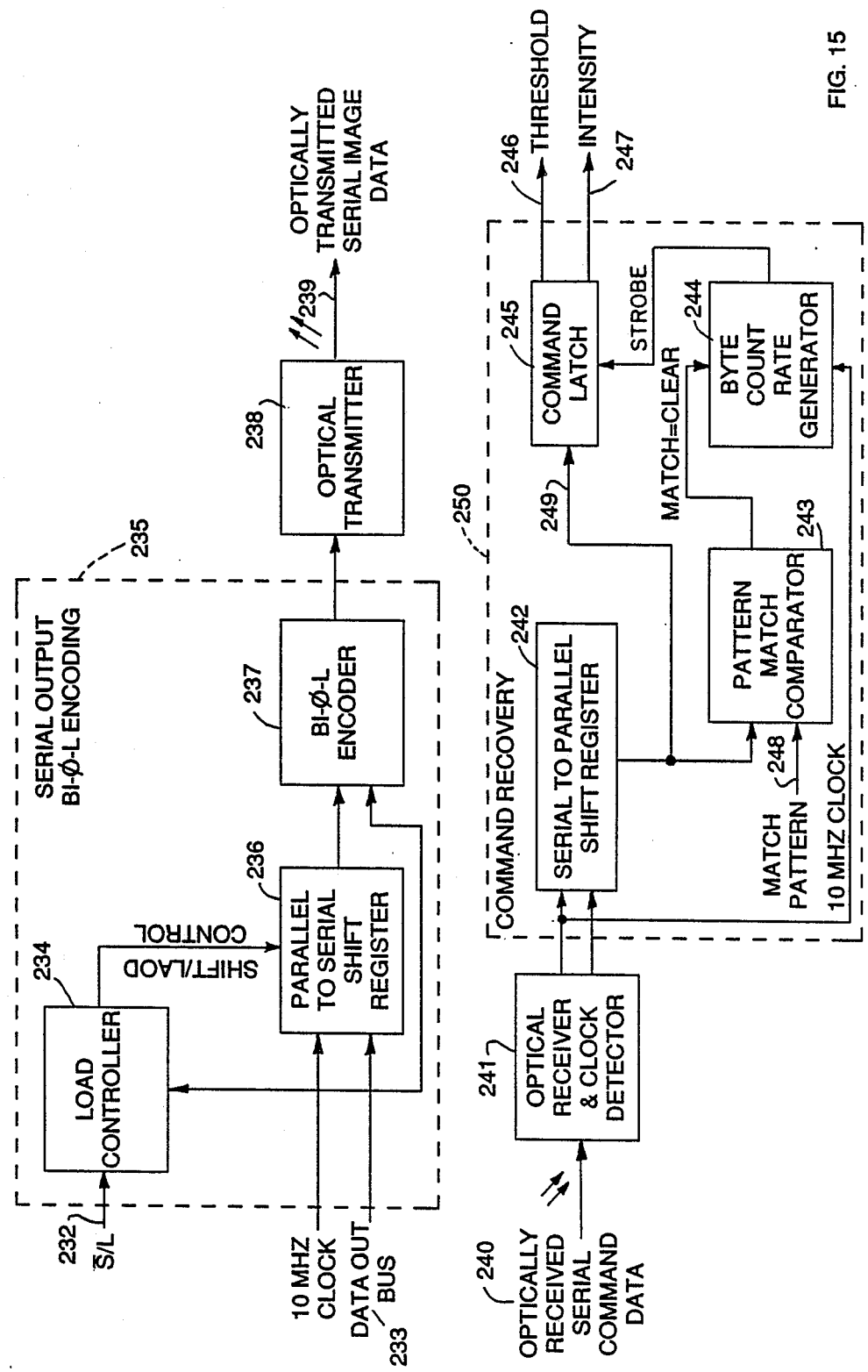

OPTICAL OUTPUT TIMING

```
                            64
             !<---------- cells ------------>!
             !  1  !
         -->! cell !<--
--------!!------!!------------------------------!!-------
BLANK   !! SYNC !!  INTERSECT (row 0 = all sync) !! BLANK
--------!!------!!------------------------------!!-------
                          LINE 0

--------!!------!!------!!------!!------!!--------------!!-------
BLANK   !! SYNC !!BLANK !!  *   !!  **  !!   SYNC's     !! BLANK
--------!!------!!------!!------!!------!!--------------!!-------
                          LINE 1

--------!!------!!------!-------------------------!------!------!!-------
BLANK   !! SYNC !!BLANK!  TEXTURE                 !BLANK !BLANK !! BLANK
--------!!------!!------!-------------------------!------!------!!-------
                          LINE 2

--------!!------!!------------------------------------------!!-------
BLANK   !! SYNC !!  SHADES OF GRAY                           !! BLANK
--------!!------!!------------------------------------------!!-------
                          LINE 3
```

\*MODE ON LAST ROW OF FIELD OUTPUT - ROW 2 OF ACTUAL ADDRESS
\*\*LEVEL ON LAST ROW OF FIELD OUTPUT - ROW 2 (3 ROWS AHEAD)
    ELSE
        SYNC

SYNC  = (1111)(1111)
BLANK = (0000)(0000)
MODE  = (11CC)(00CF)
       WHERE
          C = CYCLE COUNT OF FRAMES
          F = FRAME (ODD/EVEN)
          NOTE: CCCF COUNT MAY BE RESET FROM 1 TO 16 BY
               THE VIDEO MODULE

DATA READ/WRITE TIMING TO MULTIPLEXER STORAGE

| LINE | WRITE | READ | VP1 | VP0 |
|------|-------|------|-----|-----|
| 0 | INACTIVE | INTERSECT | 0 | 0 |
| 1 | TEXTURE | INACTIVE | 0 | 1 |
| 2 | SHADED/GRAY | TEXTURE | 1 | 0 |
| 3 | INTERSECT | SHADES/GRAY | 1 | 1 |

FIG. 16

IMAGE PRE-PROCESSING SUB-SYSTEM

BACKGROUND OF THE INVENTION

This invention relates to an image pre-processing sub-system for a computer-controlled visual feedback system intended for user-defined high speed machine control and object inspection applications.

Various image processing systems have been employed to translate an image obtained from a video camera to data which can be interpreted by one or more computers. Very computation intensive methods have been employed to make this translation. The trend is toward hardware support of this processing task to improve the response time. The fastest of such systems is too slow for most dynamic control operations, even when several parallel high speed microprocessors support the controlling computer. Insufficient support for linkage of boundary segments, detected by hardware or software support sub-systems, has left too much processing to the controlling computer. The result has been that image processing applications are slow. Control systems, depending upon visual feedback, are further limited to simple, slow dynamic operations. Consequently, a visual feedback control market is presently in its infancy. Product inspection apPlications have utilized the majority of image processing equipment developed to date. These systems are relatively expensive because of the associated computer and hardware costs. The inspection throughput rate is limited because of the long processing time required; this further adds to the inspection cost.

Most image processing systems conform to the traditional mathematical methodologies for translation of video camera output to usable data. These methodologies include filtering, thresholding, and processing of convolution patterns. Usually, the output of these processing operations is an enhanced set of data of equal or greater volume than the digitized video source data processed initially. These data are then further processed by hardware, software, or a combination, into boundary data recognizable by the controlling computer. The volume of processing operations and data handling operations is enormous. To speed the conclusion from these operations, parallel path processing techniques have been employed.

High resolution image processing has been a requirement for inspection operations. The operating speed must roughly increase with the square of the desired linear resolution, to process image data in a given time. Consequently, resolution limitations are presently resolved at the price of sacrificed operation speed.

Depth perception is presently achieved by extensive processing which typically accomplishes image ranging having poor accuracy. The long processing time limits machine control applications to very slow speeds.

An image pre-processing sub-system according to the present invention provides processed and linked image boundary data to a controlling computer of a system and provides electronic camera direction and magnification control capabilities to the computer to establish a high speed image evaluation system capable of high speed depth perception. The presently disclosed apparatus includes a video camera, which is controlled by an external system computer, and an image pre-processor, which processes video data to provide boundary linkage, texture, and shades-of-gray data to the computer. The computer is considered external to the sub-system since user supplied software provides the unique control response required by the user. The computer identifies the area of investigation, based upon the input data from the image pre-processor and the user supplied software computer control. It also provides electronic aiming controls to the camera. The disclosed embodiment illustrates data transfer, from the image pre-processor to the computer through interface circuitry, through a fiber optic link. The command path, from the computer interface to the image pre-processor, is also a fiber optic link. The integral interaction between the camera and the image pre-processor provides the high resolution processing and direction determining capability at real time processing speed. The extent of completeness of the processing allows one or more computers to receive this data and perform useful control tasks in real time.

The video camera is designed to provide output video data representing all or a selectable portion of the entire video image received by the camera. It is designed to scale the output data inversely proportional to the amount of reduction of the selected portion of the entire image. This permits the camera to output the same number of lines and the same time duration of line sweep time over the reduced portion size. Consequently, the smaller image portion is magnified and has greater line density and line spacing density, resulting in greater resolution. Therefore, as the image portion is reduced, the utilized resolution is increased. Reduction of the selected image portion can be obtained, with resulting resolution improvement, until the resolution limits of the camera video tube and supporting circuitry are reached. The center location of the reduced image portion can be positioned in both the horizontal and vertical directions. The camera has means to control the horizontal angle that the line sweep travels permitting the output image to be rotated. The camera responds from computer controls to reduce the image portion, to relocate the portion center, and to rotate the image. The resolution, of the step size of each of these parameters, is determined by the respective control signal resolution.

The image pre-processor provides the conversion from video data to a condensed usable form recognizable by a computer. The first step of the process is to digitize the video data. The data currently digitized are compared with data detected a few sample intervals earlier to determine if they exceed a computer controlled threshold. This process takes place at each sample interval and is accomplished in both the horizontal and vertical directions. When sufficient redundant samples indicate that a contrast exists, a boundary condition is determined. With the display area sub-divided into 4 × 4 (horizontal × vertical) sample interval spacings in units called cells, the four cell sides are evaluated for boundary detection. If an image boundary exists, a tangent line segment through the cell is identified. This tangent, an intersection of two tangents, or lack of boundary data (null) condition is encoded into an intersect code. The intersect code possesses information identifying the tangent segment, the segment's angle from horizontal, and the adjacent cells connecting. An indication of the side of the boundary containing greater light intensity is also provided. The horizontal component of contrast data is also used to provide a texture indication which is a count of the rate of occurrence of contrast detections per unit number of sample intervals. An average shades-of-gray indication for each cell is developed. An average image intensity is also developed for each field displayed which provides the computer data to regulate the video gain controls. Each of these data is temporarily stored, providing a delay which permits an ordered output of data with the sweep position (relating to the camera) identifying the data location and type.

The boundary detection processing determines boundaries without resorting to the mathematic methodologies commonly used by current technology. A small fraction of a field of data is stored at any one time. The propagation delay from the initial digitizing of data, at an area of the image, until an output results with encoded data of the area is only a few scan lines of the image as a result of the comparison technique. The comparison technique provides for noise filtering and boundary enhancement due to a majority logic processing employed to detect boundary conditions. The data management sorting and output control is accomplished by hardware to speed the process. The encoded data output to the computer is in condensed form. The output data is processed sufficiently to relieve the computer of time consuming boundary chaining tasks.

BRIEF DESCRIPTION OF THE DRAWINGS

FIG. 15 is a block diagram showing input and output data transfer.

FIG. 16 is a chart illustrating the sequence of transfer of output data types.

DESCRIPTION OF THE PREFERRED EMBODIMENT

Figure 1:
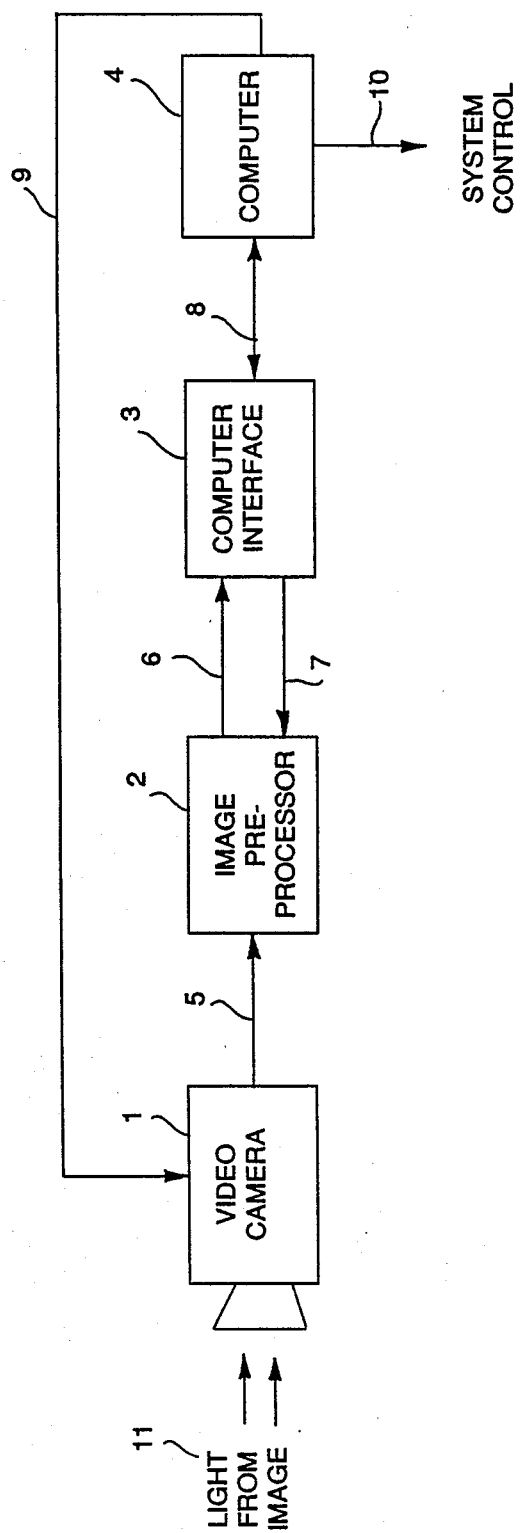
FIG. 1 is a block diagram showing a system implementation of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further application of the principles of the invention as illustrated therein being contemplated as would normally occur to one skilled in the art to which the invention relates.

Referring in particular to FIG. 1, there is shown a system implementation of the image pre-processing sub-system apparatus including the video camera 1 and image pre-processor 2 according to the present invention. Computer interface 3 and computer 4 are system level components, beyond the scope of this disclosure, which will be tailored to a specific application but are shown to relate their interaction to the present invention. Light 11 from the object being viewed is detected by video camera 1 which generates an output video signal 5. The image pre-processor 2 receives the video signal 5 and develops a condensed, processed form of image data at signal 6 which is transferred to the computer interface 3 and to the computer 4 via path 8. Computer 4 exercises image threshold control over the image pre-processor 2 via path 8, through the computer interface 3, and via signal path 7. Paths 6 and 7 are fiber optic conductors in the present embodiment. Computer 4 can then further evaluate the processed image data, in accordance with a user defined program, to control the video camera 1 electronic aiming and magnification capabilities through path 9, which will later be defined by FIG. 18. Computer 4 also provides the system control 10 (or other response) which is the result of the system process.

Figure 2:
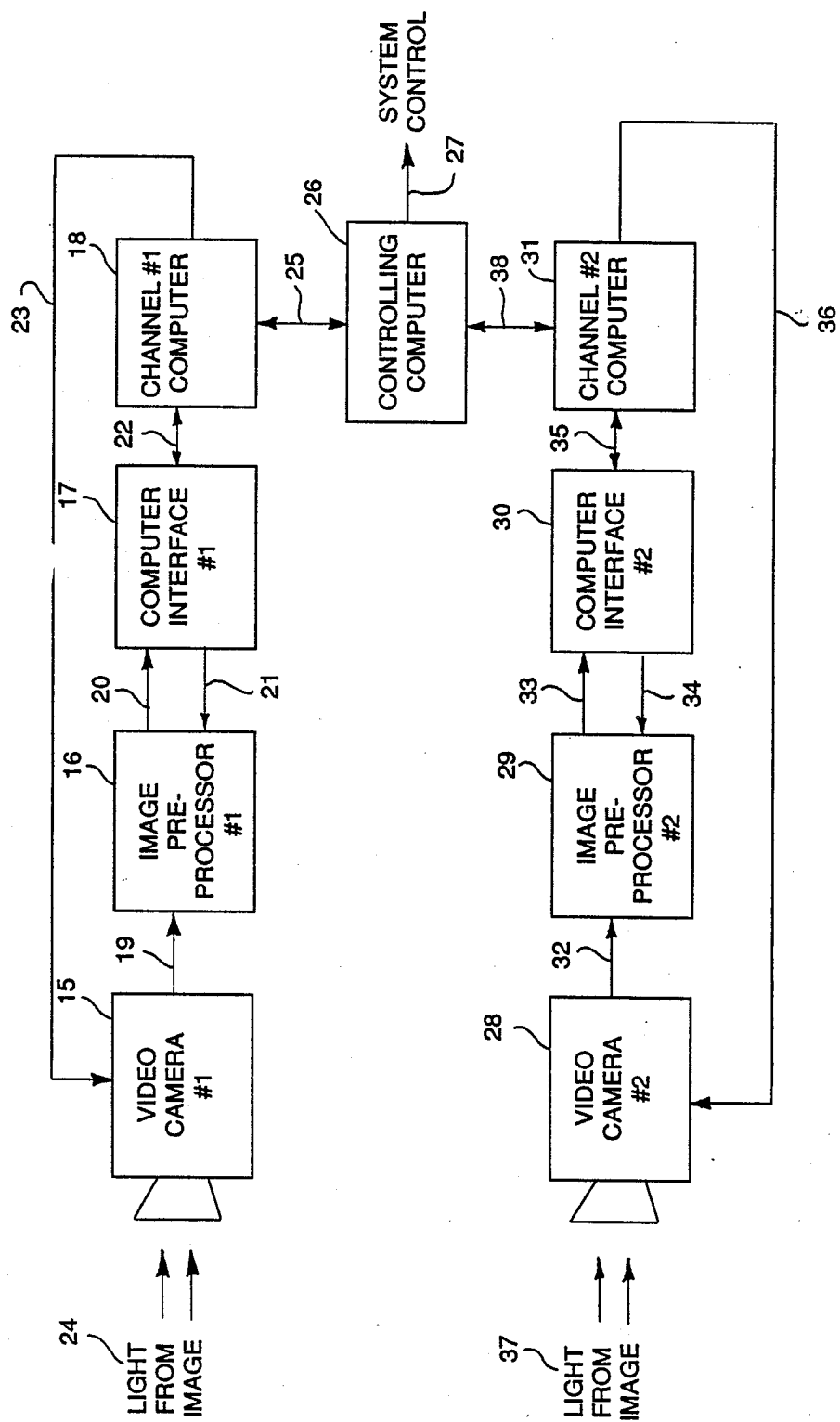
FIG. 2 is a block diagram representing a dual channel implementation used for depth perception.
Figure 3:
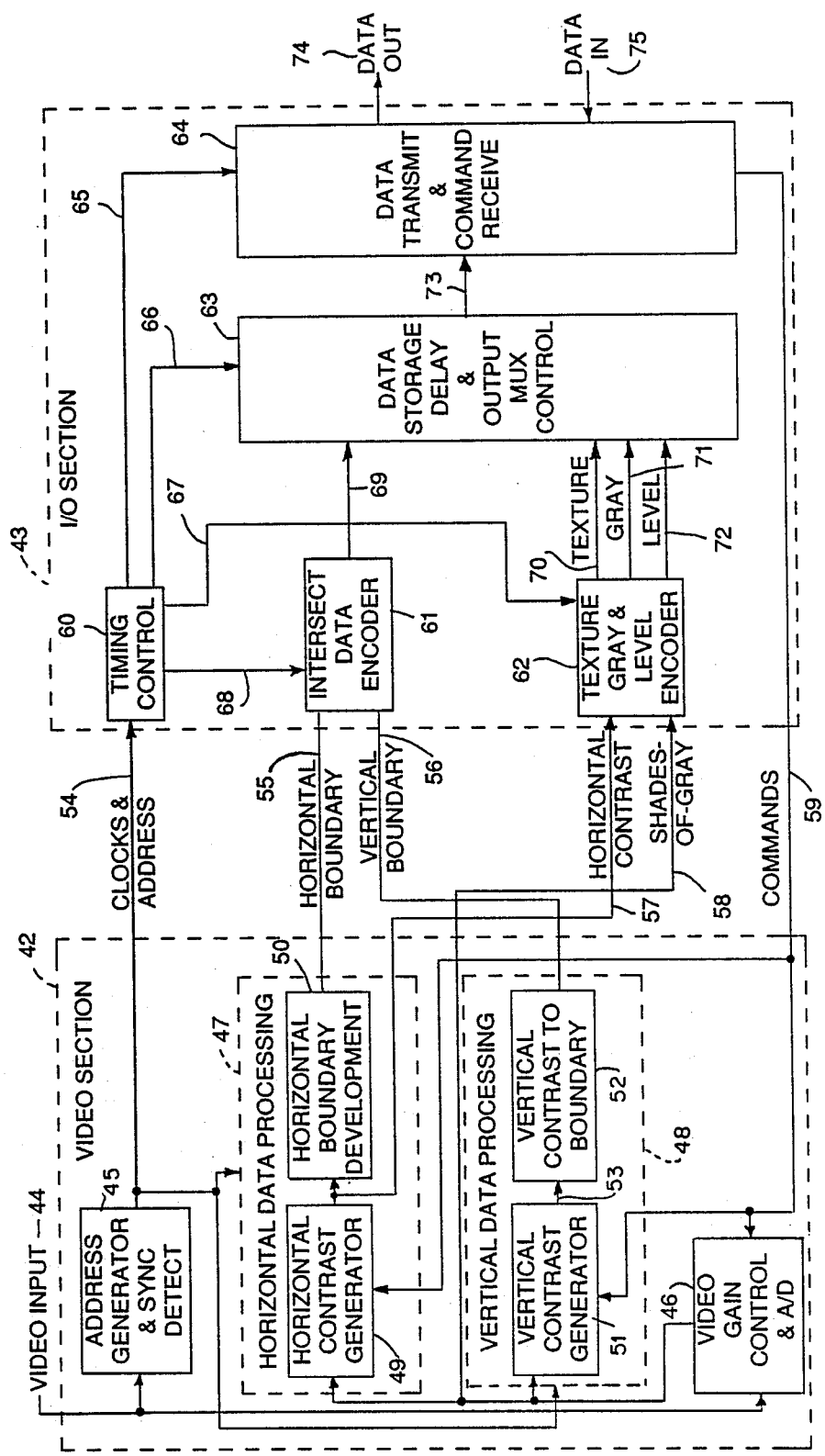
FIG. 3 is a block diagram of the image pre-processor of the present invention.

Referring now to FIG. 2, a dual channel implementation of the system of FIG. 1 is shown with channel number one including video camera 15, image pre-processor 16, computer interface 17, computer 18, and paths 19, 20, 21, 22, and 23. Video camera 15 responds to light 24 from the object being viewed. Channel number two includes video camera 28, image pre-processor 29, computer interface 30, computer 31, and paths 32, 33, 34, 35, and 36. Video camera 28 responds to light 37 from the object being viewed. The information from the two systems is interrogated by controlling computer 26 through paths 25 and 38 to develop system control 27 from the results of the data transferred in accordance with a user supplied program. The configuration shown is useful for measuring distance to an object using triangulation methods as will be shown later in FIG. 26. Referring now to FIG. 3, the block diagram shows the image pre-processor sub-divided into two major sections, the video section 42 and the I/0 section 43. Video section 42 receives a video input 44 which is applied to address generator & sync detect 45 and to video gain control & A/D 46. Address generator & sync detect 45 detects the line and field sync signals as a means of synchronizing an address counter representative of image location on the video camera screen and outputs clock & address 54 signals. Video gain control & A/D 46 accepts commands 59 signals to adjust the video input gain and d.c. offset. Video gain control & A/D 46 also digitizes the video signal following gain adjustment and outputs shades-of-gray 58 signals which are applied to horizontal contrast generator 49, of the horizontal data Processing 47 sub-section, and vertical contrast generator 51, of the vertical data processing 48 sub-section. Horizontal contrast generator 49 accepts threshold level control from commands 59 signals and develops horizontal contrast 57 indications at each digitized sample interval. The horizontal contrast 57 signal is evaluated by horizontal boundary development 50 to provide a horizontal boundary 55 output. Vertical contrast generator 51 accepts threshold level control from commands 59 signal and develops contrast signal 53 which is applied to vertical contrast to boundary 52. Vertical contrast to boundary 52 generates the vertical boundary 56 signal. I/0 section 43 accepts the clock & address 54 signals at timing control 60 which generates timing signals 65, 66, 67, and 68 to data transmit & command receive 64, data storage/delay & output mux control 63, texture, gray & level encoder 62, and intersect data encoder 61, respectively. Intersect data encoder 61 accepts horizontal boundary 55 and vertical boundary 56 signals for development of intersect and type 69 signals. Texture, gray & level encoder 62 accepts horizontal contrast 57 and shades-of-gray 58 signals to develop texture 70, gray 71, and level 72 signals. Data storage/delay & output mux control 63 accepts intersect and type 69, texture 70, gray 71, and level 72 signals for reorganization and sequential output at signal 73 to data transmit & command receive 64. Data transmit & command receive 64 develops a serial bit stream output through an optical link at data out 74 and accepts data in 75 from an optical link for conversion to parallel command data which is output at commands 59.

Figure 4:
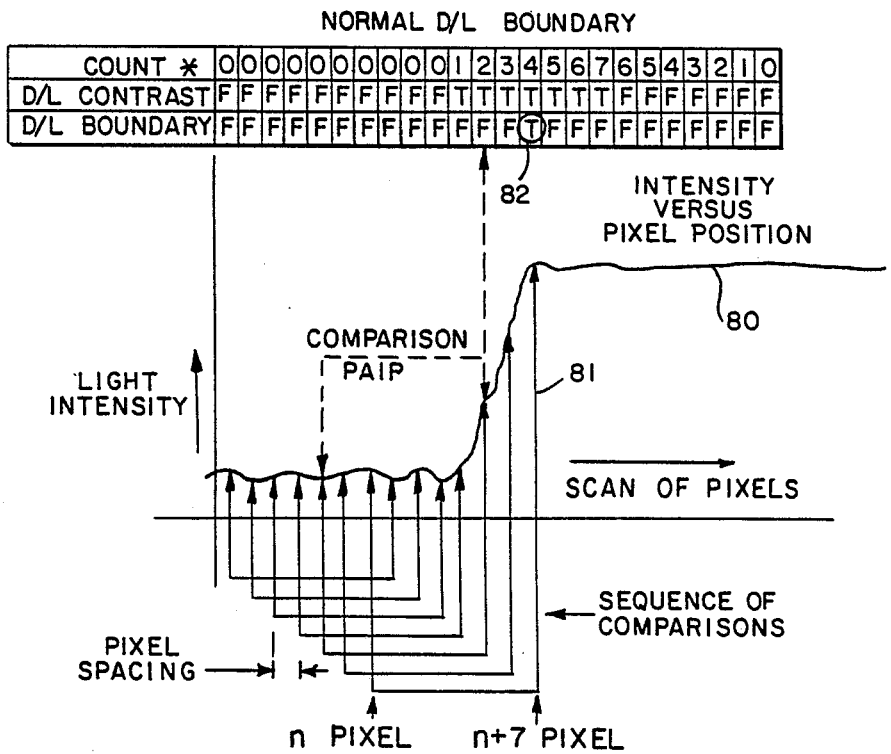
FIG. 4 illustrates dark to light transition comparison and boundary detection.

Referring now to FIG. 4, the video dark-to-light transition (referred to as DL contrast) waveform 80 and sequence of comparisons 81 are shown in an analog representation, although it is understood that these are digitized levels in the present embodiment of the invention. A comparison span is seven sample intervals which is determined each sample interval as shown by sequence of comparison 81. Other span intervals could be used including computer selectable intervals. A threshold level, established by computer control, determines the threshold sensitivity of pairs of sequence of comparisons 81 measurements. With the first occurrence of four indications of contrast out of seven consecutive samples, a boundary indication 82 will be determined. Only one boundary indication is permitted within any four consecutive sample intervals. The resultant boundary location is skewed from the true boundary location, and a correction must be implemented in follow-on processing. The detection of horizontal boundary occurs in the same sequence as the video camera horizontal sweep. Consequently, the delay of sample data, to compare current with delayed data, is accomplished with shift registers and a Programmable Logic Device (PLD) as a comparator. Boundary detection is also determined with a PLD sampling several consecutive contrast results. The detection of vertical boundary requires that delayed data be stored in Random Access Memory (RAM) and retrieved at proper timing for comparison and boundary detection in a manner similar to that accomplished in the horizontal direction. Boundary enhancement occurs due to the redundancy of the majority logic approach which reconstructs missing data.

Figure 5:
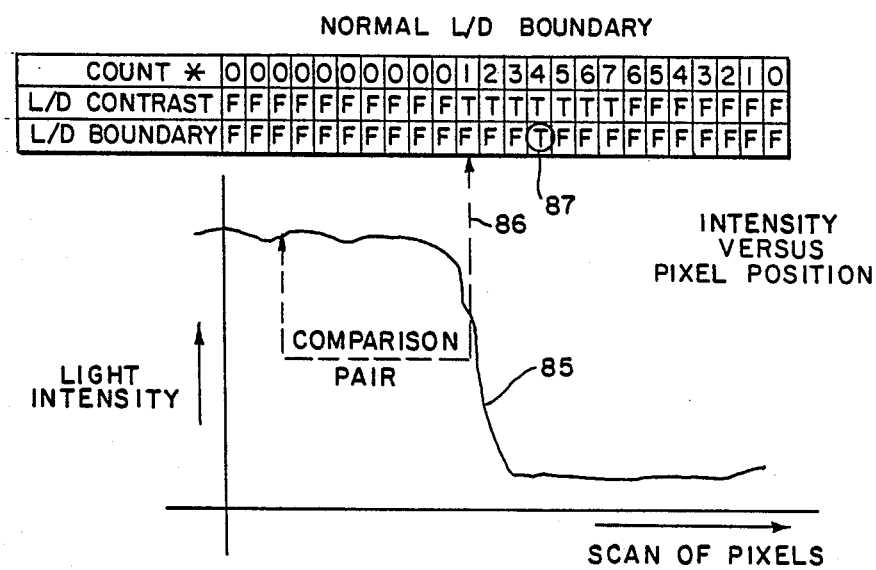
FIG. 5 illustrates light to dark transition comparison and boundary detection.

Referring now to FIG. 5, the video light to dark transition (referred to as LD contrast) waveform 85 and comparison pair 86 are shown producing boundary indication 87. The process is nearly identical with that shown for FIG. 4. The boundary processing path must be redundant with that of FIG. 4. However, the contrast detection processing uses common circuitry.

Figure 6:
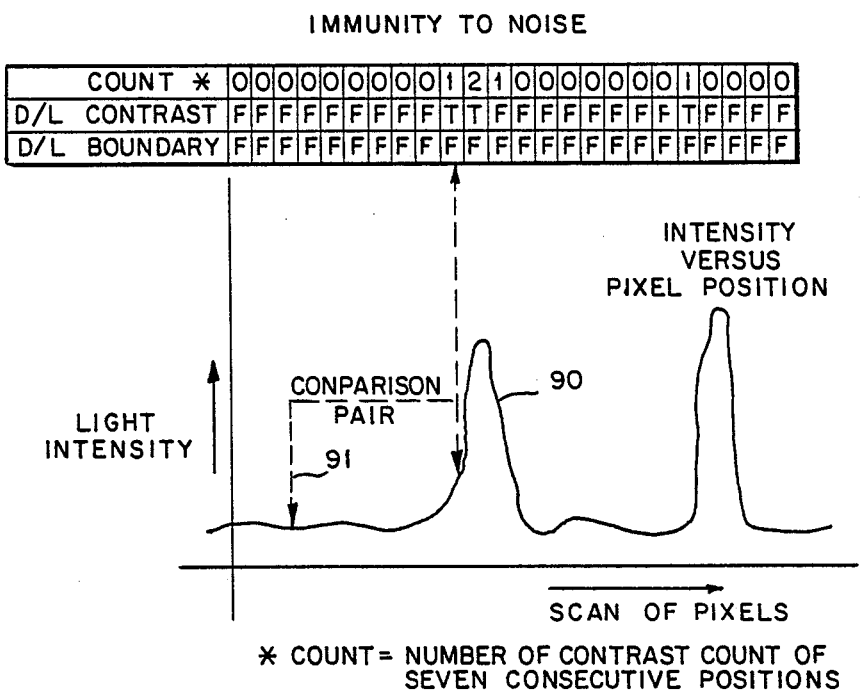
FIG. 6 illustrates noise immunity.

Referring now to FIG. 6, the video waveform 90 shows abrupt, narrow light intensity changes. Comparison pair 91 detects contrast but does not detect four indications within seven sample intervals. Consequently, a boundary condition is not registered and the noise content is ignored. Thus, noise suppression is achieved.

Figure 7:
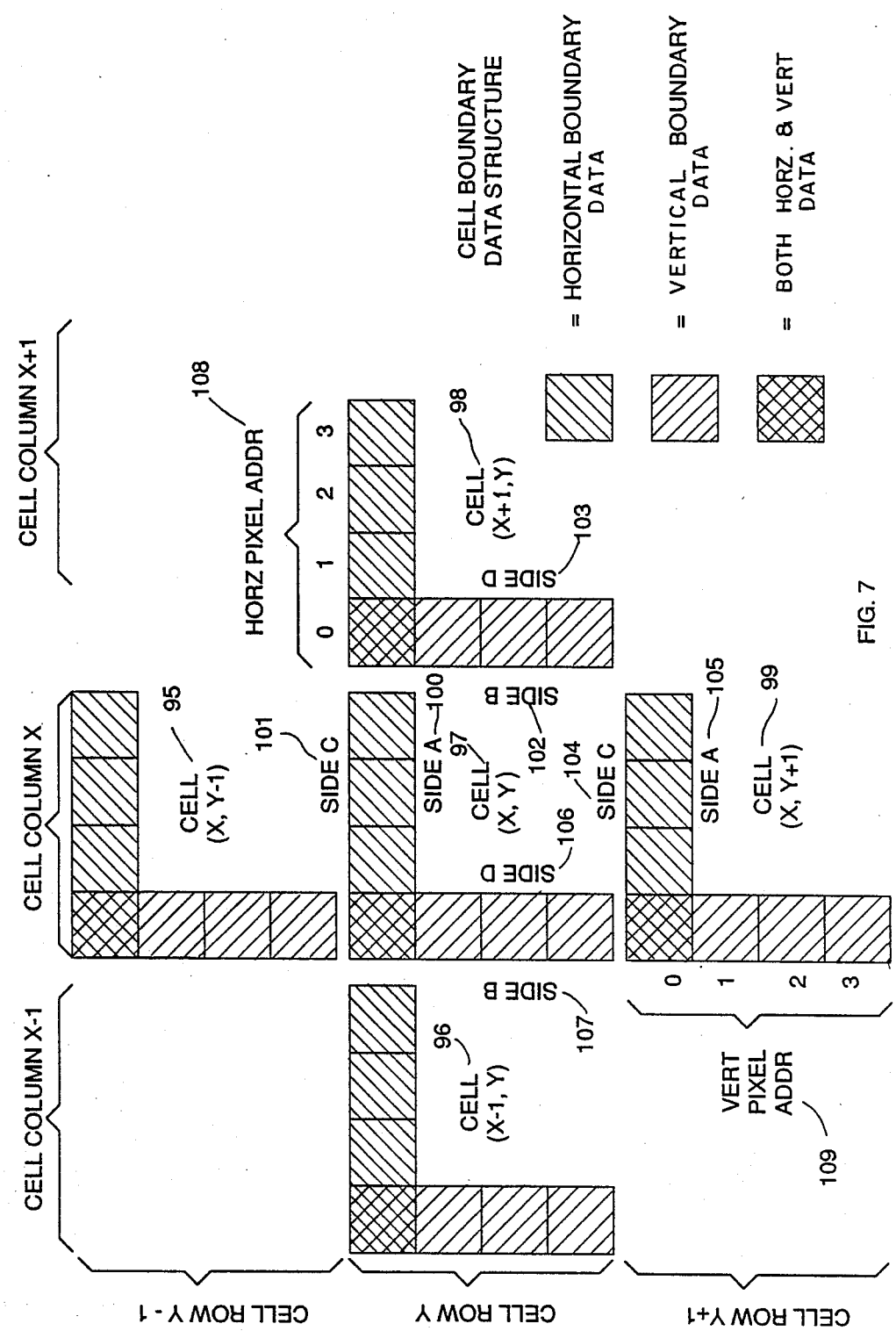
FIG. 7 illustrates cell boundary data structure.

Referring now to FIG. 7, the cell structure for boundary data storage is shown with attention centered on cell(x,y) 97, located x cell columns to the right of the far left column(0) and located y cell rows down from the far top row(0). The present embodiment of the invention has 256 × 256 pixel resolution with each cell occupying 4 × 4 pixel spacings (not the same as pixel positions). Consequently, there are 64 columns x 64 rows of cells of image viewing area per field. Each cell shares a side with the adjacent cell such that each cell contains 5 × 5 pixel recordings (4 pixel spacings/side). Boundary data is recorded for only the outer perimeter pixel locations of each cell. To reduce data storage, only two sides of boundary data are stored each cell. The perimeter positions are identified having horz pixel addr 108 from zero to three and having vert pixel addr 109 (equivalent to line number) from zero to three. Horizontal boundary data for cell(x,y) 97 is stored at cell(x,y) horizontal memory storage location as side A 100 data. This also represents side C 101 data for cell(x,y−1) 95 but is not stored the second time. In a similar manner, vertical boundary data for cell(x,y) 97 is stored at cell(x,y) vertical memory storage location as side D 106 data. This also represents side B 107 data for cell(x−1,y) 96. Intersect data is encoded from the boundary indications at the perimeter of the cell with two extra codes provided, one for a null cell and one for an intersection of two line segments. Note that a line connected between two boundary indications on the cell perimeter (only one indication can exist on a side) forms a tangent line segment of the image. Only one tangent line segment, an intersection of two line segments, or a null condition can represent a cell. In the case of a tangent line segment, its angle to the horizontal position is known from the intersect code. The intersect code also identifies the adjacent cell positions which link to a tangent segment.

Figure 8:
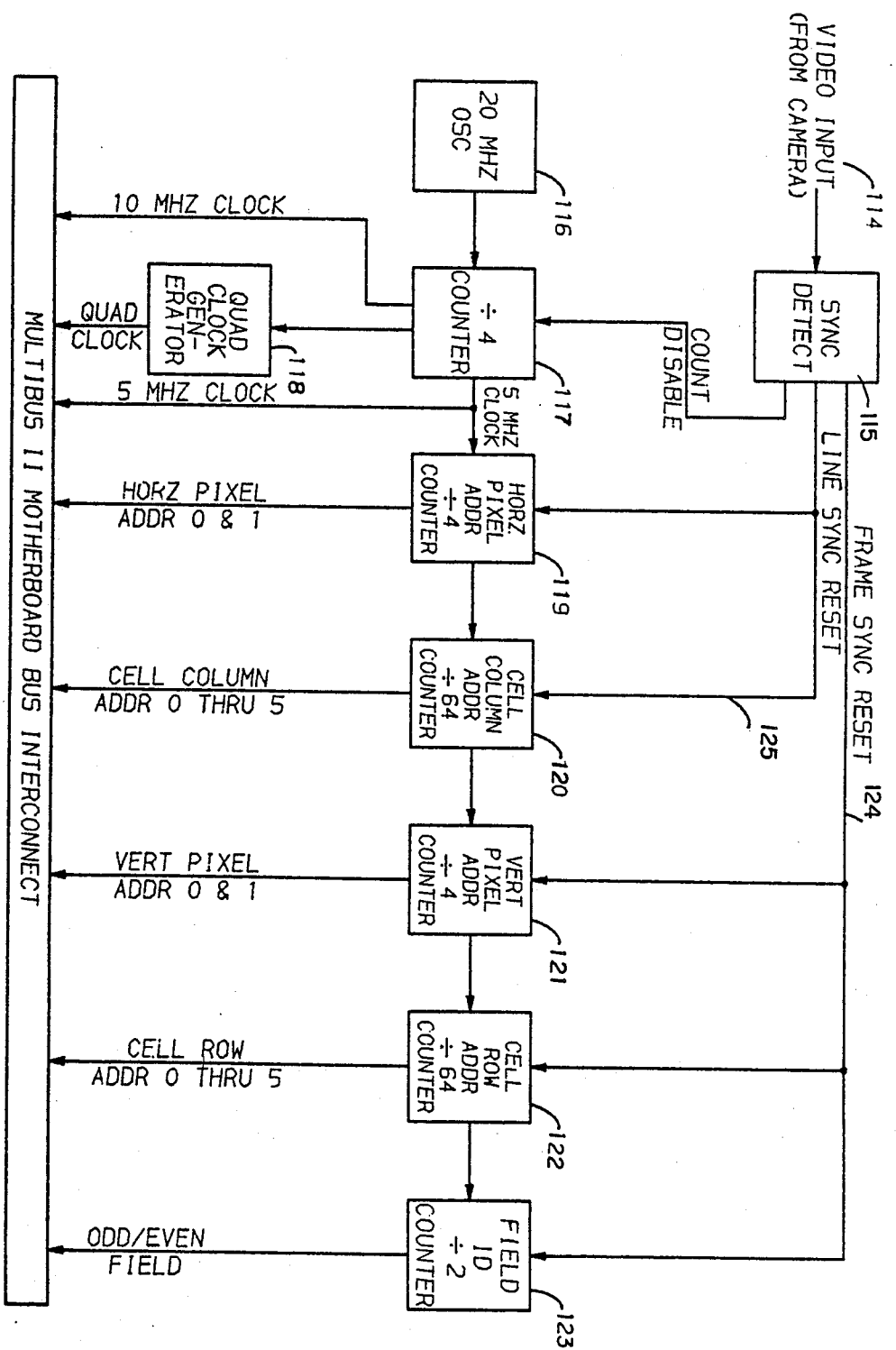
FIG. 8 is a block diagram representing the timing to address relationship of data locations within the video signal.

Referring now to FIG. 8, address generator & sync detect 45 from FIG. 3 is detailed. Video input 114 is applied to sync detect 115 to create the frame sync reset 124 and line sync reset 125 signals which control the reset of the counter chain to maintain synchronization. The counter chain is initiated by 20 MHz osc 116 and applied to counter 117 which produces 10 MHz clock, 5 MHz clock, and an input to quad clock gen 118 which produces a quadrature 5 MHz clock. Horz pixel addr 119 counter, cell column addr 120 counter, vert pixel addr 121 counter, cell row addr 122 counter and field ID 123 counter complete the timing chain and produce the associated address controls.

Figure 9:
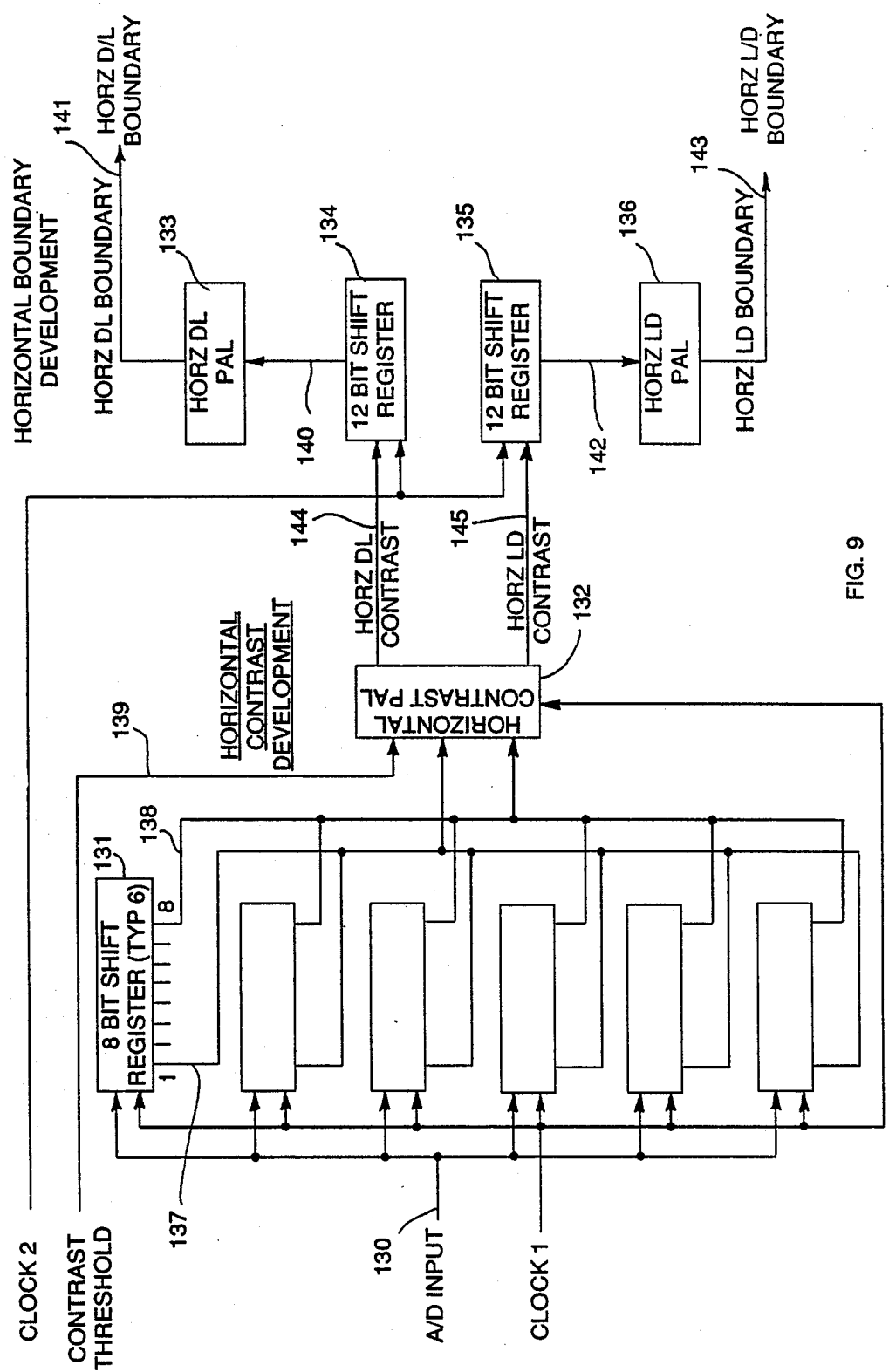
FIG. 9 is a block diagram showing the horizontal boundary processing.

Referring now to FIG. 9, horizontal data processing 47 from FIG. 3 is detailed. Each bit of A/D input 130 is applied to a serial to parallel eight bit shift register, of which shift register 131 is typical. Each shift register provides two output bits, 137 and 138, with seven position span corresponding to the seven sample interval span. Each of the pairs of bits from the shift registers is applied to horz contrast Programmable Array Logic (PAL) 132. Computer controlled contrast threshold 139 is also applied (three bits). Horz contrast PAL 132 (a PLD) produces horz DL contrast 144 and horz LD contrast 145 from the programmed logic of the PLD. Each of these outputs is applied to serial to parallel shift registers (134 and 135) to apply a twelve bit output at 140 and 142 to horz DL PAL 133 and horz LD PAL 136, respectively. These devices are PLDs and provide an output single bit indication (141 and 143) of boundary status which is serially output to indicate boundary conditions throughout the horizontal sweep.

Figure 10:
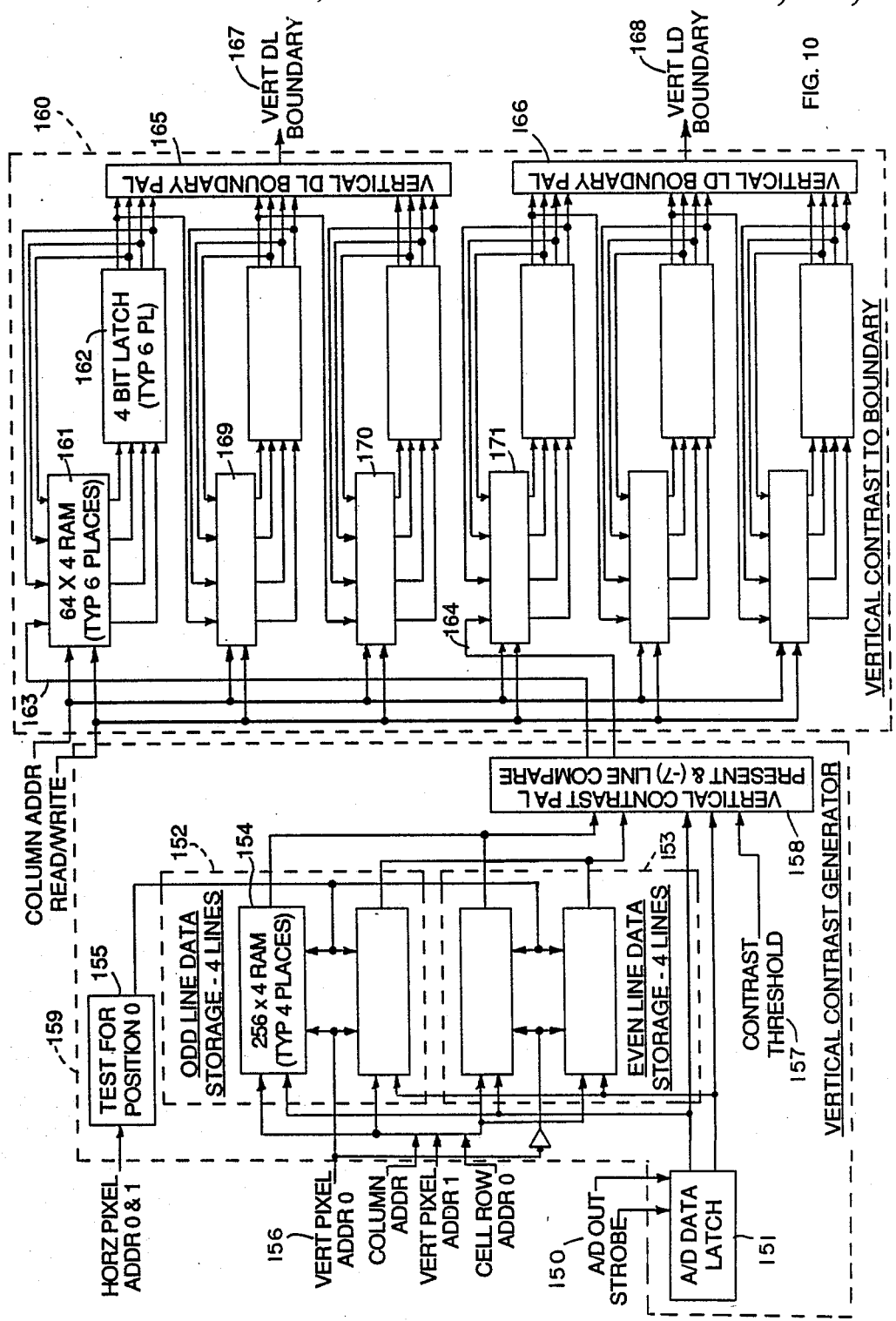
FIG. 10 is a block diagram showing the vertical boundary formation.

Referring now to FIG. 10, vertical data processing 48 from FIG. 3 is detailed. This circuitry is shown in two sub-sections, vertical contrast generator 159 and vertical contrast to boundary 160. The vertical contrast generator 159 receives real time A/D out 150 signals and latches this data in A/D data latch 151. The latched data is simultaneously applied to odd line data storage 152 and to even line data storage 153 to RAM, f which RAM 154 is typical. The data is stored in only one of the two data storage banks (152 or 153) depending upon the odd/even status of the line number. While one bank is storing current data, the opposite bank is retrieving data which occurred seven lines previously. The current data, the previous data, and computer controlled threshold data are each applied to the vertical contrast PAL 158 (a PLD). Vertical contrast PAL 158 generates two one bit outputs, vert DL contrast 163 and vert LD contrast 164. These outputs are stored in RAMs 111 and 171. RAM 161, 169, and 170, in association with latches of which latch 162 is typical, form a progressively shifting data transfer that provides the same response as 64 twelve bit shift registers. The 64 columns of cell data can then be stored and the effect of scanning, as done for the horizontal boundary path, can be achieved. The twelve bits of column boundary data appear simultaneously at the input of vertical DL boundary PAL 165 (a PLD) which produces a four bit vert DL boundary 167 in response to the PLD programmed logic. In a similar manner, the vert LD contrast 164 applied to RAM 171 is processed and applied to vertical LD boundary PAL 166 to produce vert LD boundary 168.

Figure 11:
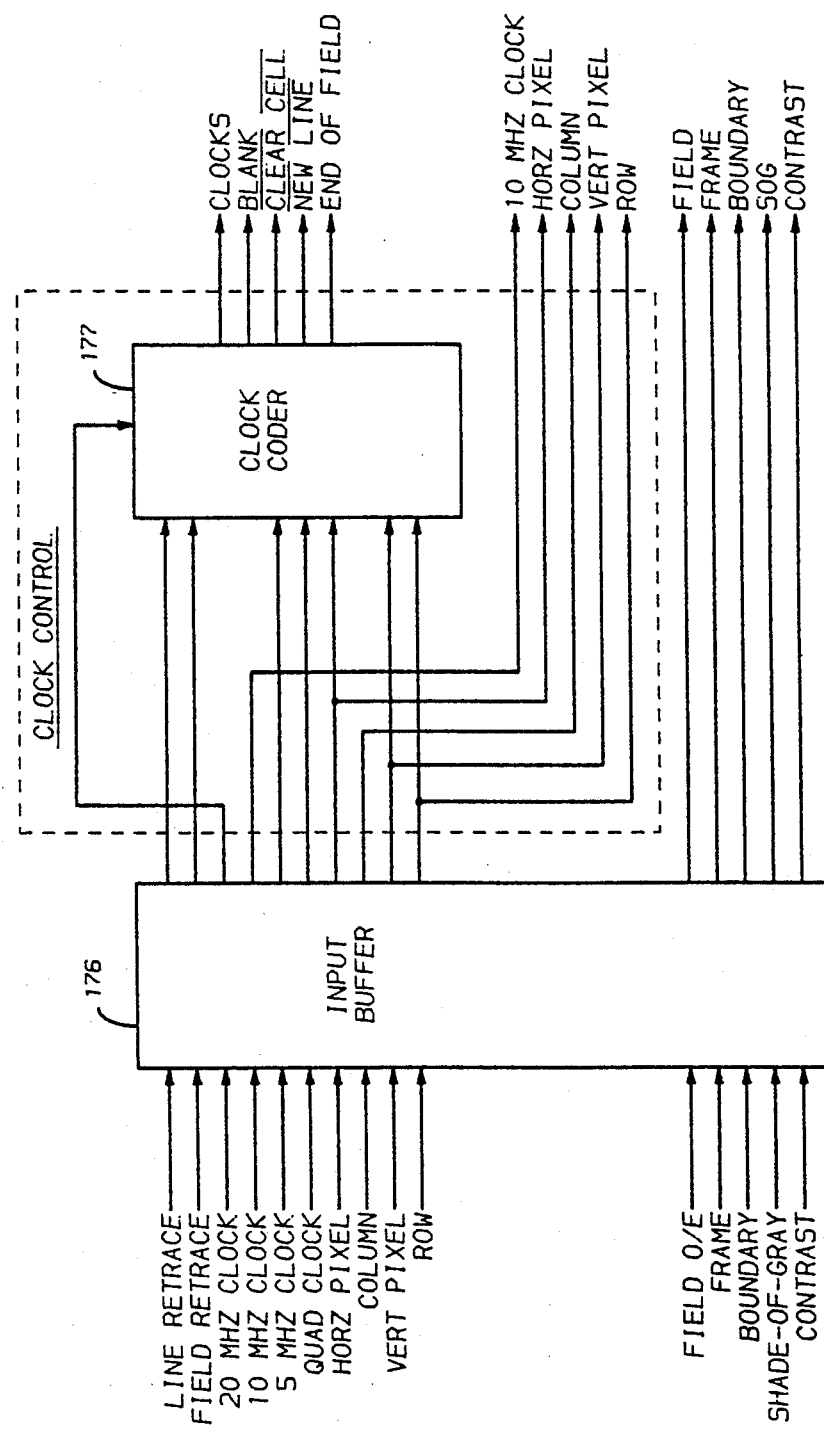
FIG. 11 is a block diagram showing the clock formation and signals used by the I/O section.

Referring now to FIG. 11, timing control 60 from FIG. 3 is detailed. Input buffer 176 provides buffering to all the signals used by the I/0 section 43 of FIG. 3. Clock coder 177 is a very high speed PLD used to create most of the timing signals used by the I/0 section 43.

Figure 12:
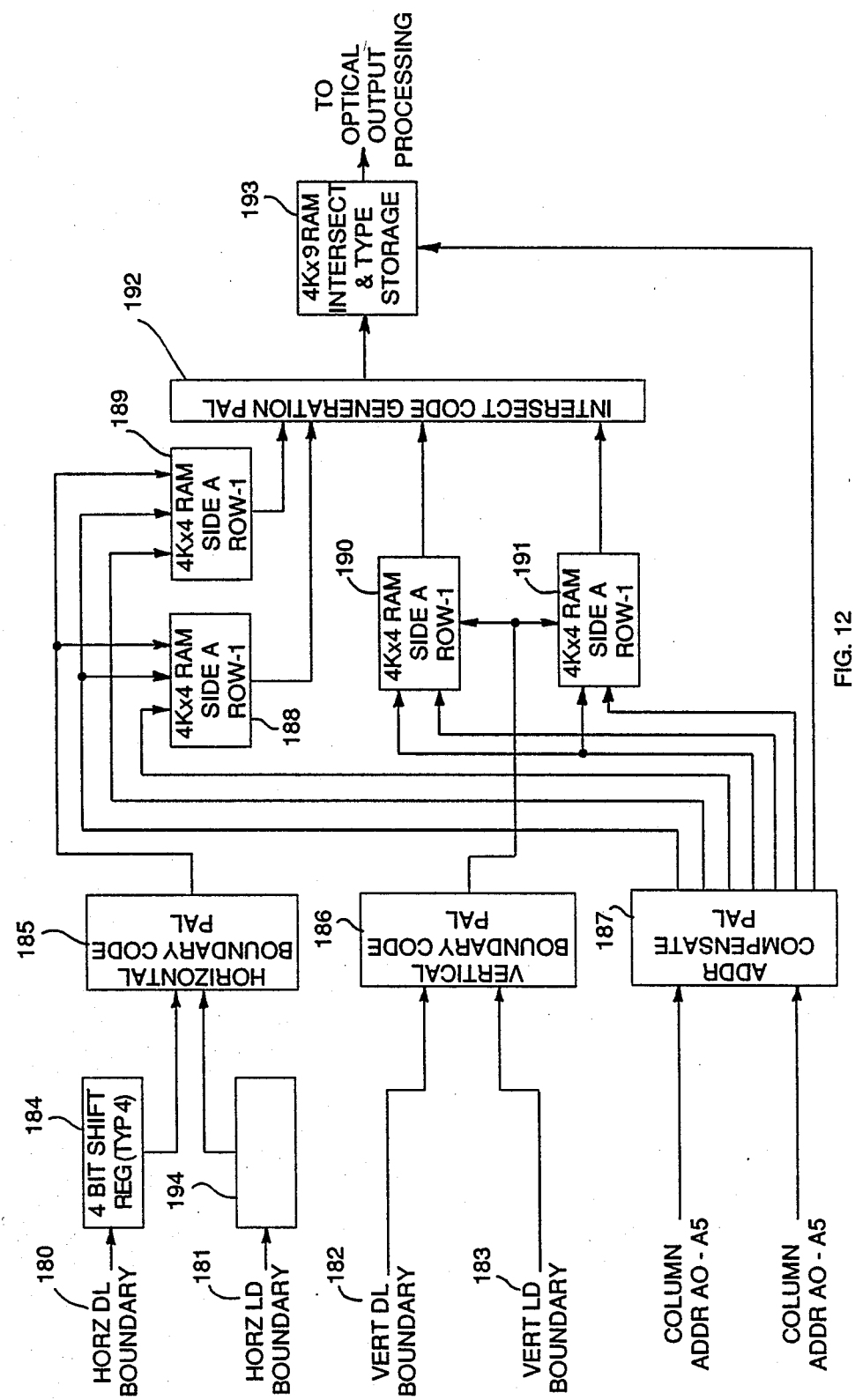
FIG. 12 is a block diagram indicating the formation of intersect and type data.

Referring now to FIG. 12, intersect data encoder 61 from FIG. 3 is detailed. Horz DL boundary 180 and horz LD boundary 181 are both applied to serial to parallel shift registers, of which shift register 185 is typical. The four bit cell horizontal boundary data of types DL and LD are encoded at horizontal boundary code PAL 185 from inputs from shift registers 184 and 194 to provide an output, which identifies the boundary location and type, that is stored in two RAMs (188 and 189). Refer to FIG. 7 for an understanding of data storage with cell(x,y) considered the current address of data storage. RAM 188 stores the current data at cell(x,y−1) as side A data to correct for skew error. Since side A data for cell(x,y−1) is the same data as side C data of cell(x,y−2), the same data is stored at RAM 189. The offset address to the RAMs, during write operations from current address, is controlled by addr compensate PAL 187. During read operations, the addr compensate PAL 187 is two rows behind the current address. This permits the intersect code generation PAL 192 to receive both side A and side C of cell(x,y) simultaneously while correcting for skew error. Since the read operation occurs on the second subsequent row, the data retrieved represents accurate data from cell(x,y). In a similar manner, the vertical boundary code PAL 186 generates an output which identifies boundary and type for the vertical data component from inputs 182 and 183. The output from vertical boundary code PAL 186 is stored in two RAMs, 190 and 191, with address compensation similar to that for horizontal data. Consequently, the four segments of data applied to intersect code generation PAL 192 (a PLD) represent the boundary conditions of a single cell except its address is displaced by two cell rows. Intersect code and type (DL or LD) are output to RAM 193, from intersect code generation PAL 192, where the data is temporarily stored. All data will later be output at a three cell row displacement (at the same column position) from its origination.

Figure 13:
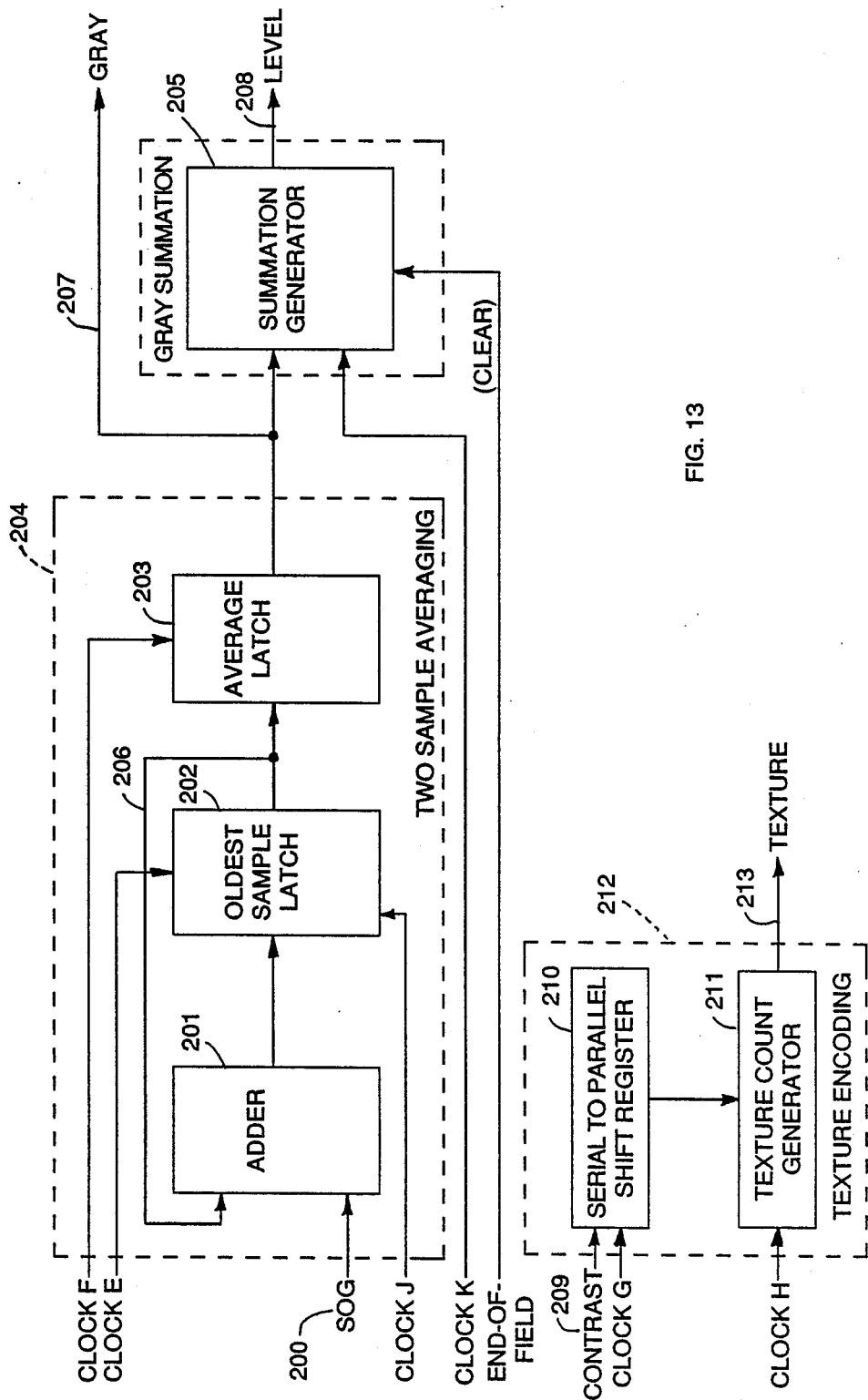
FIG. 13 is a block diagram showing formation of gray, level and texture data.

Referring now to FIG. 13, texture, gray & level encoder 62 from FIG. 3 is detailed. A shades-of-gray input, SOG 200, is applied to adder 201. In the initial state, oldest sample latch 202 has been cleared and output signal 206 provides a feedback input to adder 201 of zero. Adder 201 provides an output to oldest sample latch 202 equal to the SOG 200 input which is sequentially latched by latch 202. On the next sample of SOG 200, signals 200 and 206 are added by adder 201 to provide a sum output to latch 202 which is then latched by latch 202. The sum output is then latched by average latch 203. The output of average latch 203 is wired one bit displaced from its input to achieve a divide by two operation. Consequently, average latch 203 accepts the sum of two inputs and divides by two to average the two samples at its output 207 signal. The latches are reset, after the data has been utilized, and are then ready for the next cycle. The cycle of the two sample averaging 204 block defined is for the acceptance of two shades-of-gray samples occurring at horz pixel addr locations 1 and 3 on vert pixel addr 2 line (see FIG. 7). The gray 207 output is applied to summation generator 205 (a PLD) which adds all the gray data for a field and provides an averaged level 208 output signal. Contrast 209 input is applied to shift register 210 of the texture encoding 212 block to create an eleven bit output to the texture count generator 211 (a programmable read only memory device with a latch). A three bit texture 213 output is generated which represents the number of occurrences of contrast in eleven samples.

Figure 14:
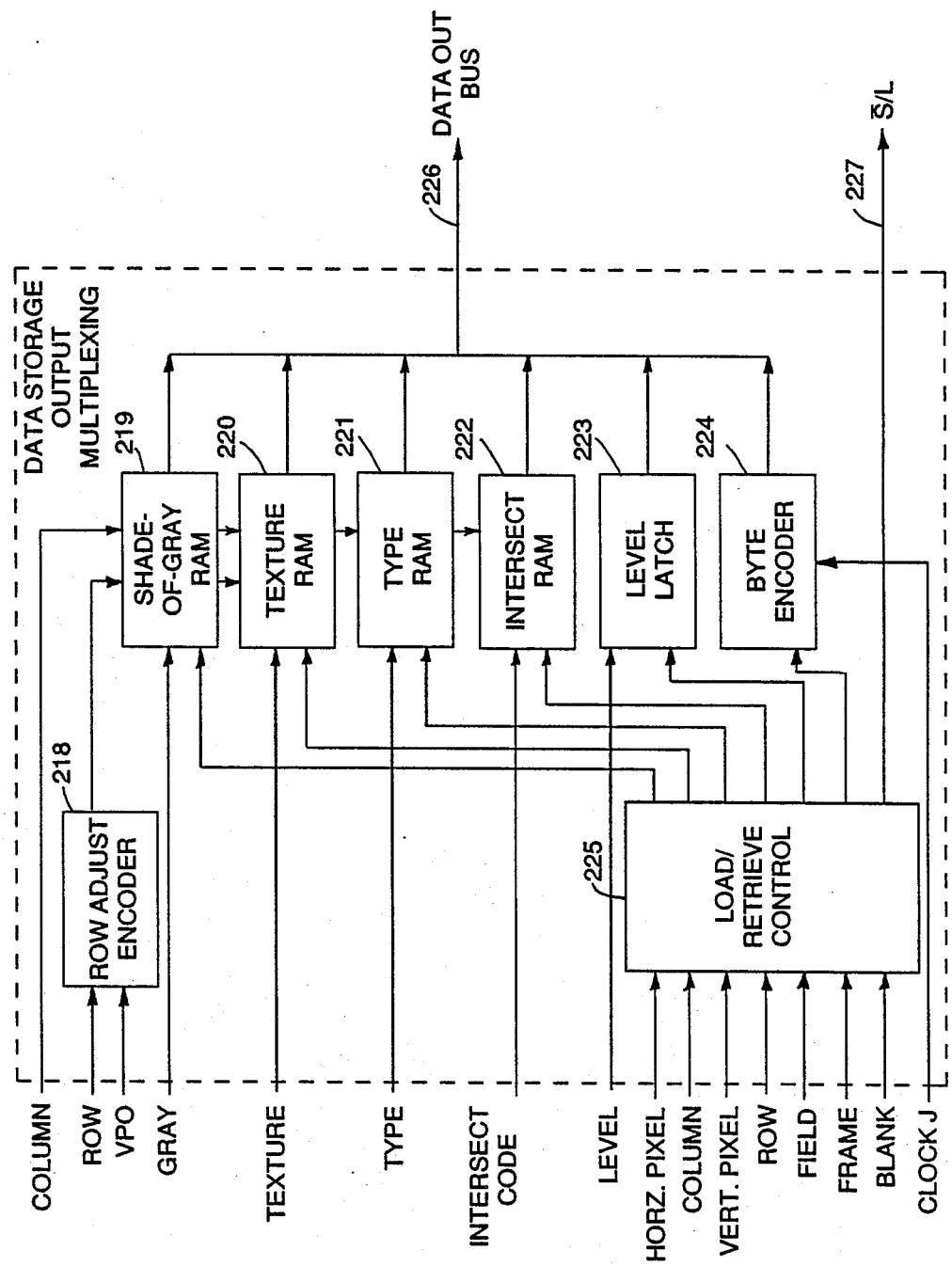
FIG. 14 is a block diagram showing the multiplexing of the several components of the output data.

Referring now to FIG. 14, data storage/delay & output mux control 63 from FIG. 3 is detailed. The purpose of this circuitry is to delay all data storage until three cell rows after its occurrence before sequentially outputting this data to the data out bus 226 in accordance with the timing to be later defined by FIG. 16. Some data has already been delayed: therefore, varying delays are added by this circuitry to make the total delay consistent. Row adjust encoder 218 (a PLD) compensates for previous row adjustments. Shades-of-gray RAM 219, texture RAM 220, type RAM 221, intersect RAM 222, and level latch 223 store their respective data type and output to the data out bus 226 under sequential control of the load/retrieve control 225 a PLD). Byte encoder 224 also outputs codes to the data out bus 226 under control of the load/retrieve control 225. The code provided by the byte encoder 224 will later be explained by FIG. 16. A S/L 227 output from the load/retrieve control 225 is generated to control the loading timing of a shift register associated with the processing of data out bus 226 data as will be shown in FIG. 15.

Referring now to FIG. 15, data transmit & command receive 64 from FIG. 3 is detailed. Data out bus 233 signals are applied to serial output bi-phase-L encoder 235 block to shift register 236 to produce a serial output to bi-phase-L encoder 237, which also accepts a clock input, to create a bi-phase encoded output to optical transmitter 238. Optical transmitter 238 then outputs serial image data 239 to an optical link. Input S/L 232 is applied to load controller 234 to produce a load pulse to shift register 236 at proper timing. Optical serial command data 240 is received at optical receiver & clock detector 241 and produces an electrical signal which is applied to command recovery 250 block at shift register 242. Shift register 242 converts the input to parallel output 249 which is simultaneously applied to command latch 245 and pattern match comparator 243. If signal 249 matches match pattern 248, pattern match comparator 243 generates a clear signal to byte count rate generator 244 (a counter) as long as match data is being transmitted. During intervals where new data is not being transmitted, byte count rate generator 244 will be reset before it has a chance to output a strobe. Once data is being transmitted in place of the match data, byte count rate generator 244 will reach a count sufficient to output a strobe pulse to command latch 245 causing new data to be latched. New outputs, threshold 246 and intensity 247, are distributed to accomplish their control functions.

Referring now to FIG. 16, the timing of the output data is shown. Intersect data are transmitted on cell line 0. Texture and type data are transmitted on line 2. Shades-of-gray data are transmitted on line 3. During line retrace, a blank code is provided. Some of the data is not valid at the first cell position. The first cell space is substituted with a sync code to permit line synchronization on the receiving end of the fiber optic link. Blank codes are inserted to mask some invalid texture data. Line 1 provides both cell line and field synchronization. A mode code is used to synchronize fields. It may optionally contain frame count and odd/even field data to synchronize fields, if multiple field functions are assigned. Level data occurs on the field sync output row.

Figure 17:
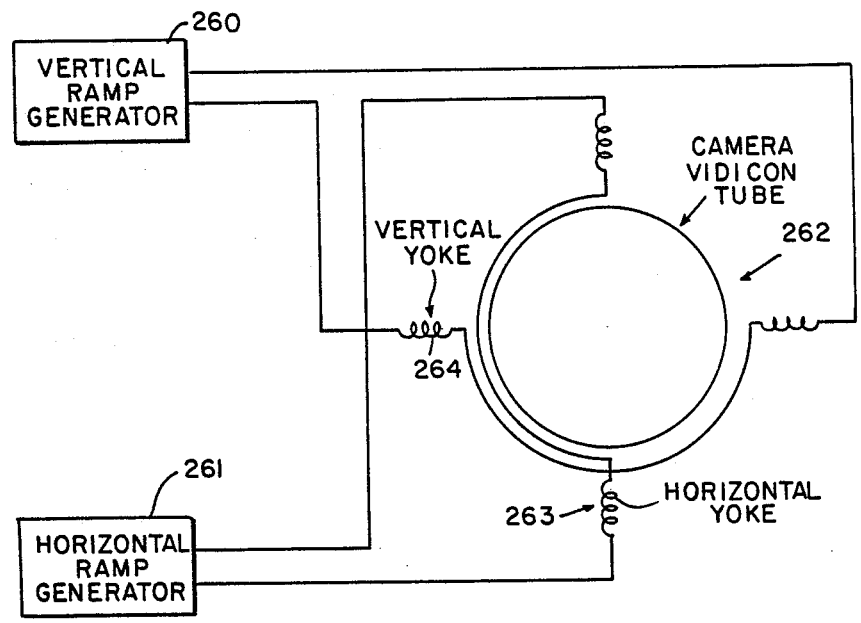
FIG. 17 is a block diagram showing a portion of a typical video camera.

Referring now to FIG. 17, a portion of a conventional video camera is shown having a vidicon tube 262, having the vertical sweep controlled by vertical ramp generator 260, and having the horizontal sweep controlled by horizontal ramp generator 261. The camera becomes unique to the application of this invention when the sweep circuits are modified (at generators 260 and 261) to provide the special features of magnification, re-location of image center, and rotation.

Figure 18:
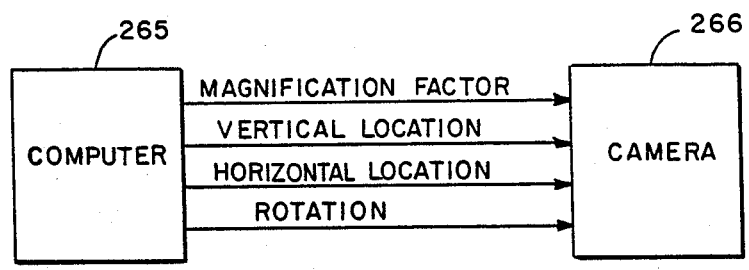
FIG. 18 is a block diagram showing the computer controls of the camera of the present invention.

Referring now to FIG. 18, computer 265 is shown to have control of camera 266 with magnification factor, vertical location, horizontal location, and rotation signals. Each of the signals could be analog or multiple bit digital signals which provide the needed resolution of camera control. The preferred embodiment of the invention uses an IEEE 488 bus communication link from the computer to the camera. The control signals are latched at ports on the receiving end in a manner common to the state of the art.

Figure 19:
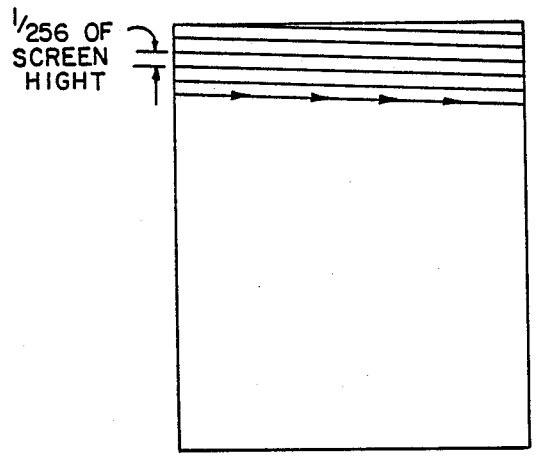
FIG. 19 illustrates the normal full screen scanning pattern of the camera of the present invention.

Referring now to FIG. 19, the entire screen image is utilized with only 256 horizontal lines transmitted per field. The camera vidicon tube utilized by this invention is large diameter and capable of many hundreds of lines of resolution. Consequently, the operation, in full screen mode, is not using the resolution capacity of the vidicon tube.

Figure 20:
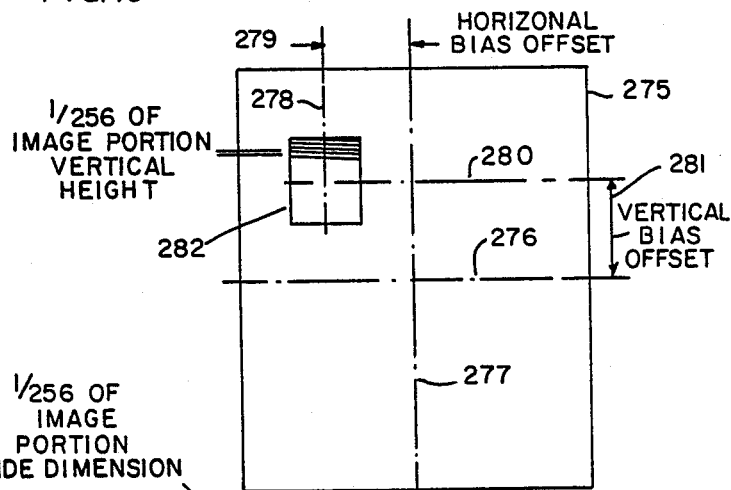
FIG. 20 illustrates the camera scanning pattern for an image portion of the total image.

Referring now to FIG. 20, a reduced image usage portion 282 of the total image area 275 is shown to be used. Again 256 horizontal lines are transmitted per field and the horizontal scan distance is proportionally reduced. The image pre-processor utilizes the scan line to produce 256 samples per line, regardless of its size. Thus, the sample density, referenced to the screen area, has increased inversely proportionally to the reduced size of utilized image. Since the sample density increases, the magnification factor of the utilized image also increases. The image area center, defined by horizontal line 280 and vertical line 278, is shown displaced from the total image area center, defined by horizontal line 276 and vertical line 277. Vertical bias offset 281 and horizontal bias offset 279 define the extent of offset from total image center.

Figure 21:
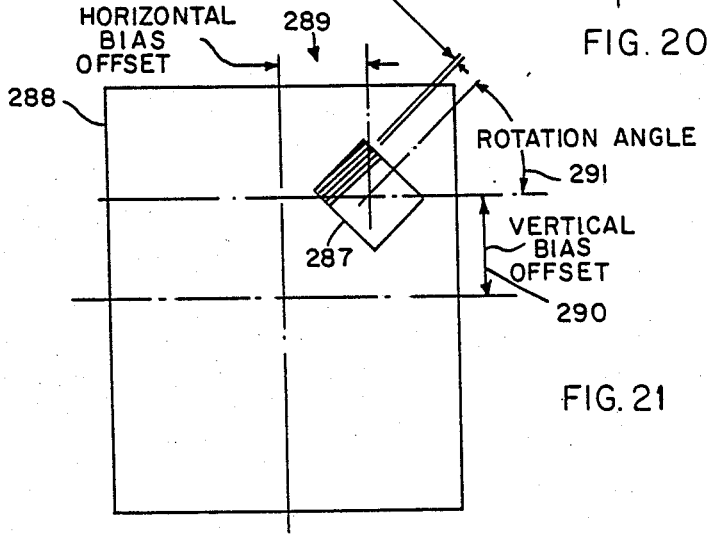
FIG. 21 illustrates the rotated camera scanning pattern for an image portion of the total image.

Referring now to FIG. 21, a reduced image usage portion 287 of the total image area 288 is shown rotated at rotation angle 291. The horizontal bias offset 289 and the vertical bias offset 290 displace the center of image portion 287 from the center of the total image 288.

Figure 22:
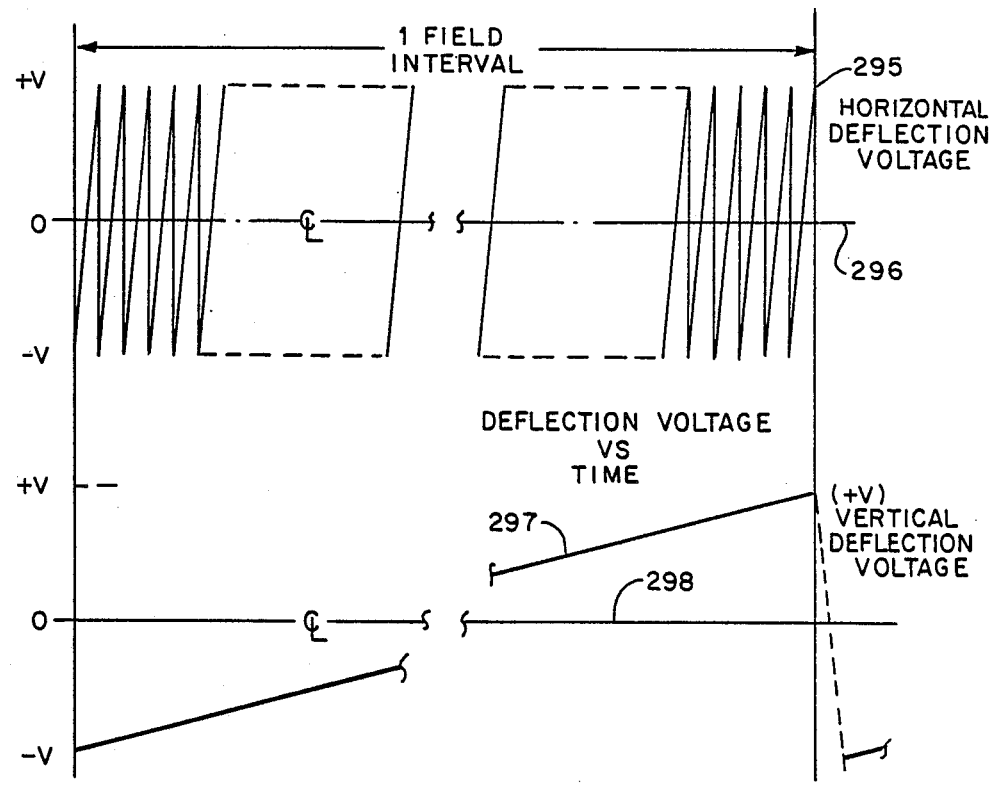
FIG. 22 illustrates the camera deflection waveforms required for generation of the image of FIG. 19.

Referring now to FIG. 22, the horizontal deflection voltage waveform 295 is centered about a zero volt line 296. The vertical deflection voltage waveform is also centered about a zero volt line 298. The waveforms are typical of conventional cameras except the vertical sweep provides only 256 lines per field. These waveforms supply the resultant image shown in FIG. 19.

Figure 23:
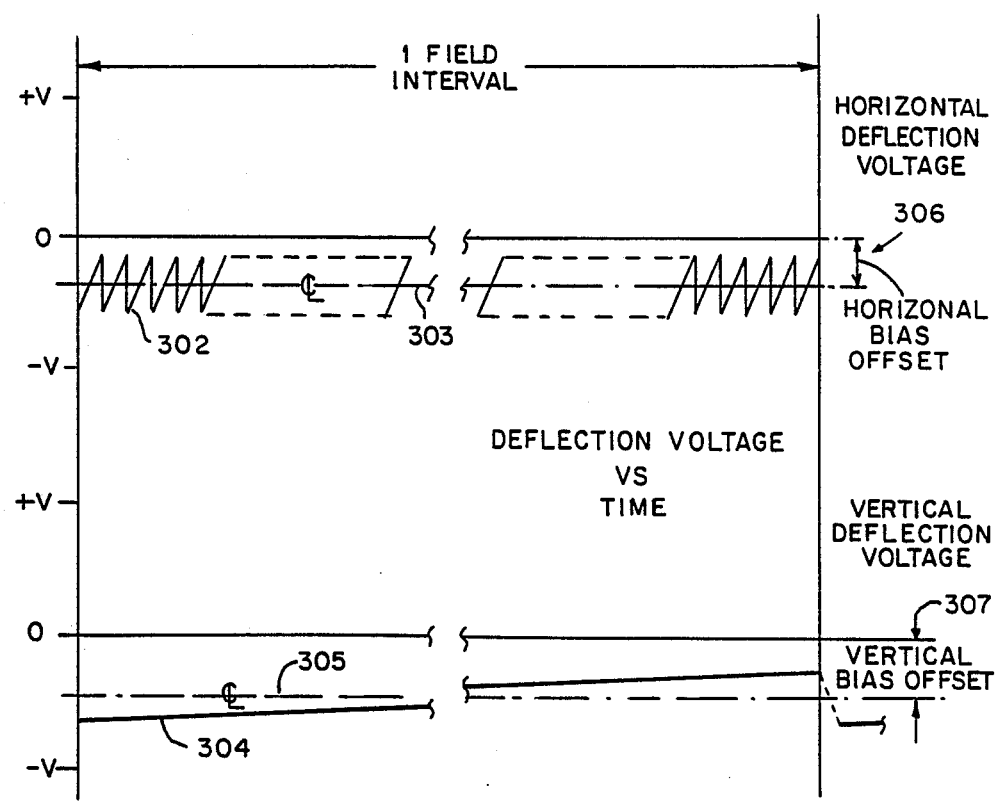
FIG. 23 illustrates the camera deflection waveforms required for generation of the image of FIG. 20.

Referring now to FIG. 23, the horizontal deflection voltage waveform 302 and vertical deflection voltage waveform 304 produce the image results shown in FIG. 20. The two waveforms have peak to peak magnitudes greatly reduced from those of FIG. 22. Horizontal bias offset 306 (a d.c. voltage component) provides the horizontal displacement of the image portion from center. Vertical bias offset 307 provides the vertical displacement of the image portion from center.

Figure 24:
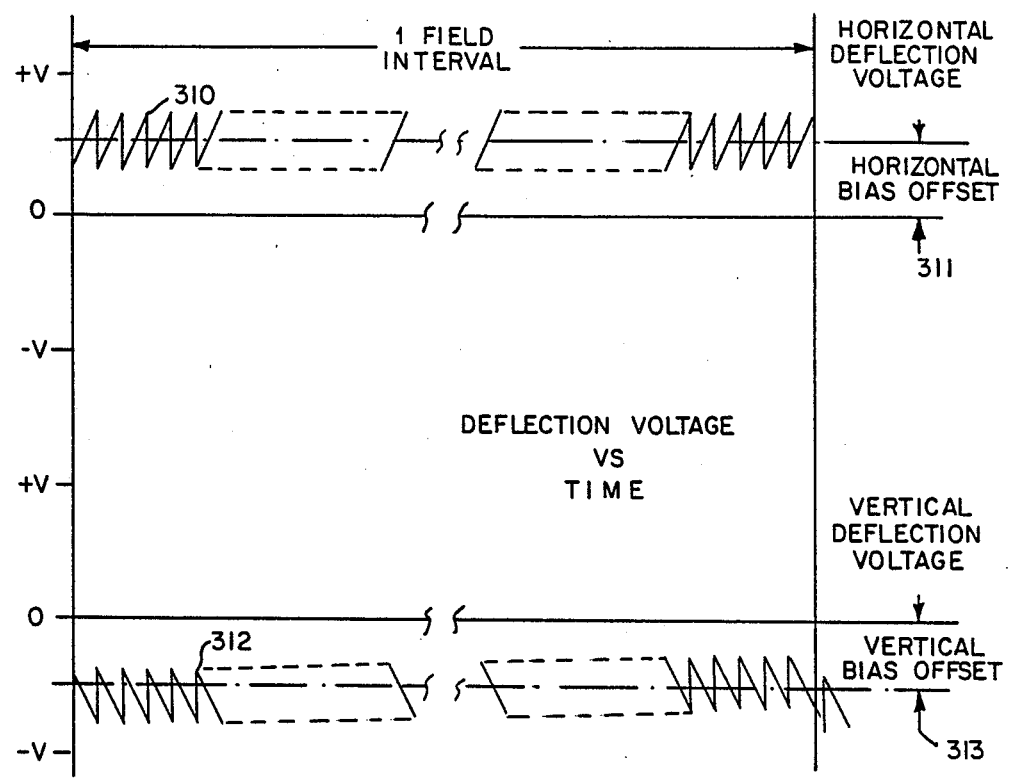
FIG. 24 illustrates the camera deflection waveforms required for generation of the image of FIG. 21.

Referring now to FIG. 24, the horizontal deflection voltage waveform 310 and vertical deflection voltage waveform 312 produce the image results shown in FIG. 21. The vertical deflection voltage waveform 312 differs from that of non-rotated images with the waveform being the superimposed slower rate ramp of the normal vertical waveform, and a waveform component proportional to the a.c. component of the horizontal deflection voltage. The ratio of the horizontal and vertical deflection voltage waveform faster ramp rate a.c. voltage component is proportional to the cosine and sine, respectively, of the rotation angle of FIG. 21.

Figure 25:
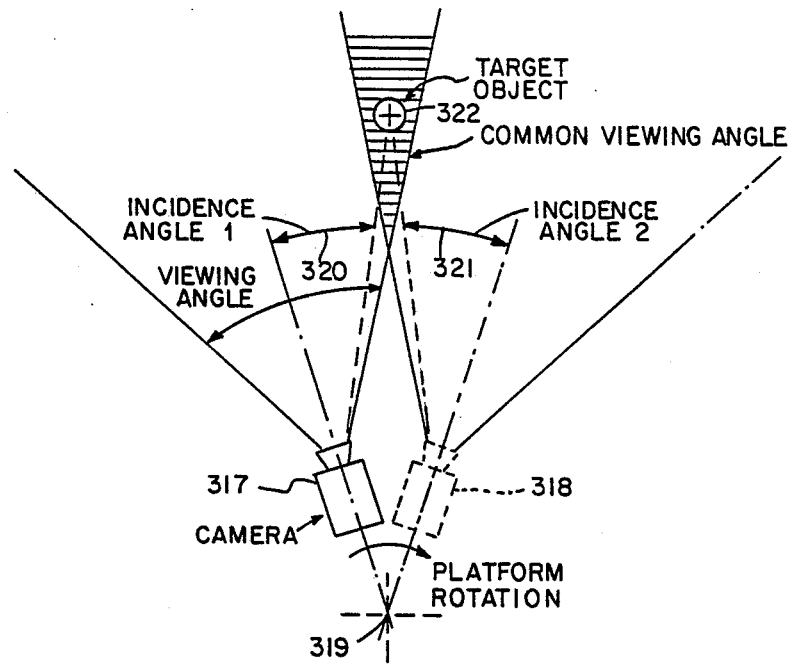
FIG. 25 illustrates the use of a single camera being physically repositioned to measure image distance.

Referring now to FIG. 25, camera 317 is mounted on a rotational platform with its center at point 319 allowing the camera to move to position 318. If the Platform sweeps from camera position 317 to 318, the camera can aim at target 322 from two different positions. The aiming is proportional to the horizontal and vertical bias offsets applied to the camera and the focal length of the camera lens. With the two intersect angles, the distance between positions, and the angle change of the camera known (sweep rate and camera detection interval known) the target distance from the camera can be computed by triangulation methods. Since the controlling computer provides the aiming controls, it has all the information needed to calculate the distance.

Figure 26:
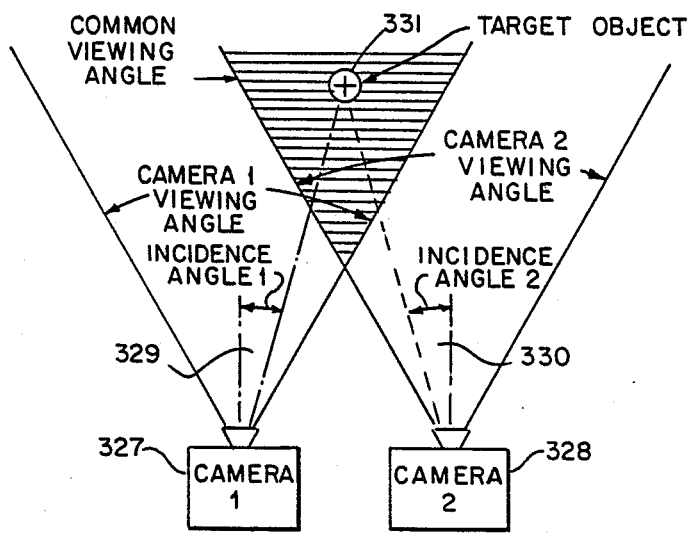
FIG. 26 illustrates the use of two cameras to measure image distance.

Referring now to FIG. 26, another method for detecting distance from object 331 using two cameras, 327 and 328, is shown. The system configuration of FIG. 2 applies. Camera 327 locates the object 331 at aiming angle 329. Camera 328 locates the object 331 at aiming angle 330. The distance is determined by triangulation.

Figure 27:
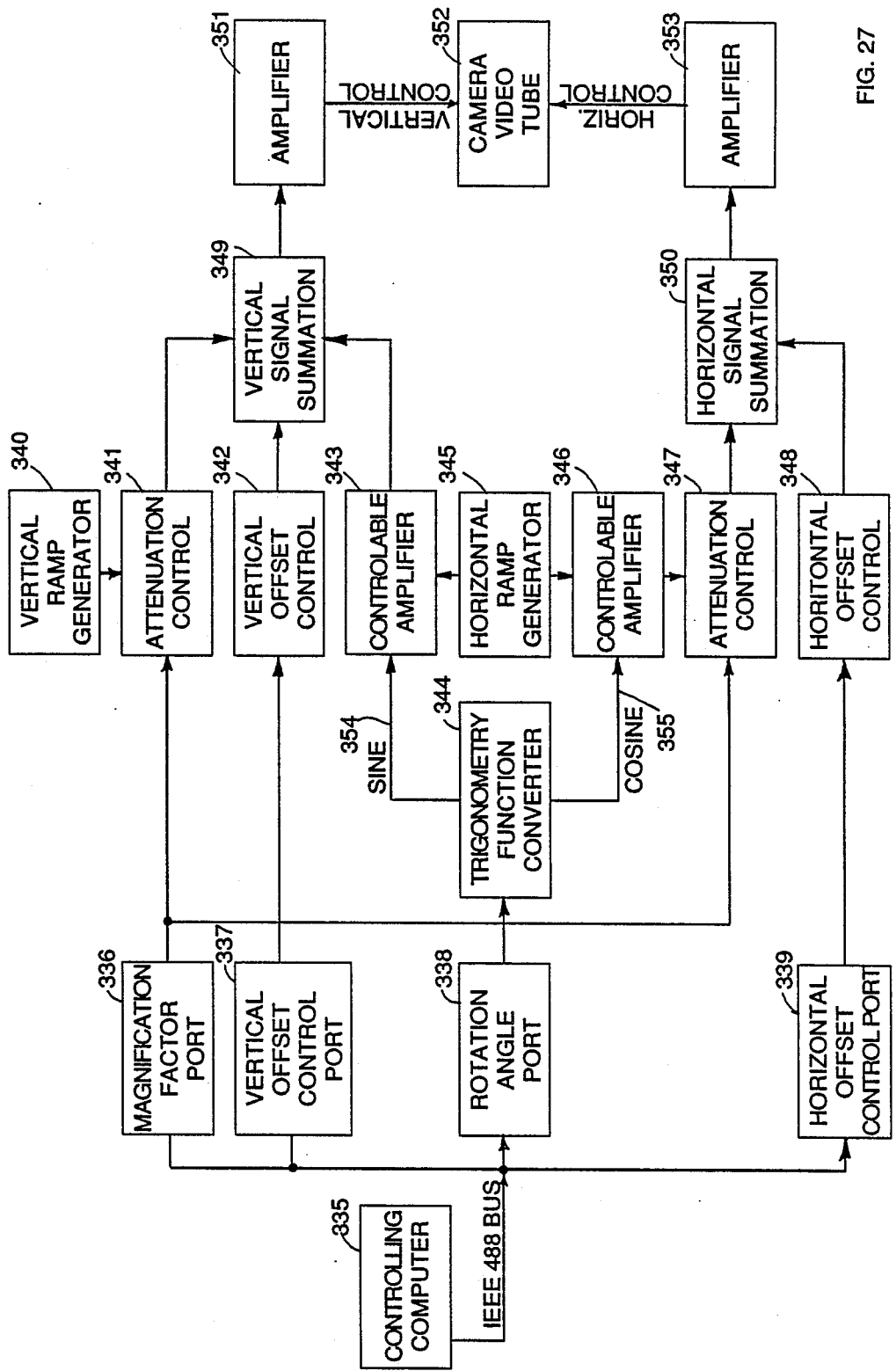
FIG. 27 is a block diagram defining the video camera deflection drive circuitry.

Referring now to FIG. 27, the horizontal and vertical ramp generator circuits are shown as they differ from the conventional camera. Vertical ramp generator 340 and horizontal ramp generator 345 are equivalent to the ramp generators of conventional cameras at the low level signal generation point prior to signal amplification. Camera video tube 352 is equivalent to a high resolution camera tube. Video camera circuitry, other than the deflection control circuits, is equivalent to that of conventional cameras. The controlling computer 335 is system level control outside the scope of this invention but shown to illustrate its control function. The controlling computer is linked to the camera circuitry using an IEEE 488 bus link. Data receiving ports, magnification factor port 336, vertical offset control port 337, rotation angle port 338, and horizontal offset control port 339 function to latch digital data, transmitted as computer commands, to regulate their respective functions, as shown by FIG. 18. Horizontal ramp generator 345 supplies a ramp signal to both controllable amplifiers 343 and 346 influencing both the vertical and horizontal signal generation, respectively. This is necessary to rotate an image. Rotation angle port 338 supplies an output to trigonometry function converter 344 (a PLD) to control the amplification of controllable amplifier 343, to achieve an output proPortional to the sine of the rotation angle, and to control the amplification of controllable amplifier 346, to achieve an output proportional to the cosine of the rotation angle. Thus, the faster ramp rate component, of both the horizontal and vertical deflection voltages of FIG. 24, are controlled by this portion of the circuitry. Magnification factor port 336 exercises control over attenuation controls 341 and 347 to decrease the signal levels of the vertical signal from vertical ramp generator 340 and the horizontal signal from controllable amplifier 346, respectively, by the same ratio. Horizontal offset control port 339 controls horizontal offset control 348 (a D/A converter) level to produce a bias dc voltage (plus or minus). Horizontal signal summation 350 receives and sums the signals from attenuation control 347 and horizontal offset control 348 and applies this signal to amplifier 353. Amplifier 353 provides the horizontal deflection drive signal to the camera video tube 352. Vertical offset control port 337 controls vertical offset control 342 to produce a bias dc voltage. Vertical signal summation 349 receives and sums inputs from attenuation control 341, vertical offset control 342, and controllable amplifier 343. The summation output is applied to amplifier 351 to produce the vertical deflection drive signal to the camera video tube 352.

Figure 28:
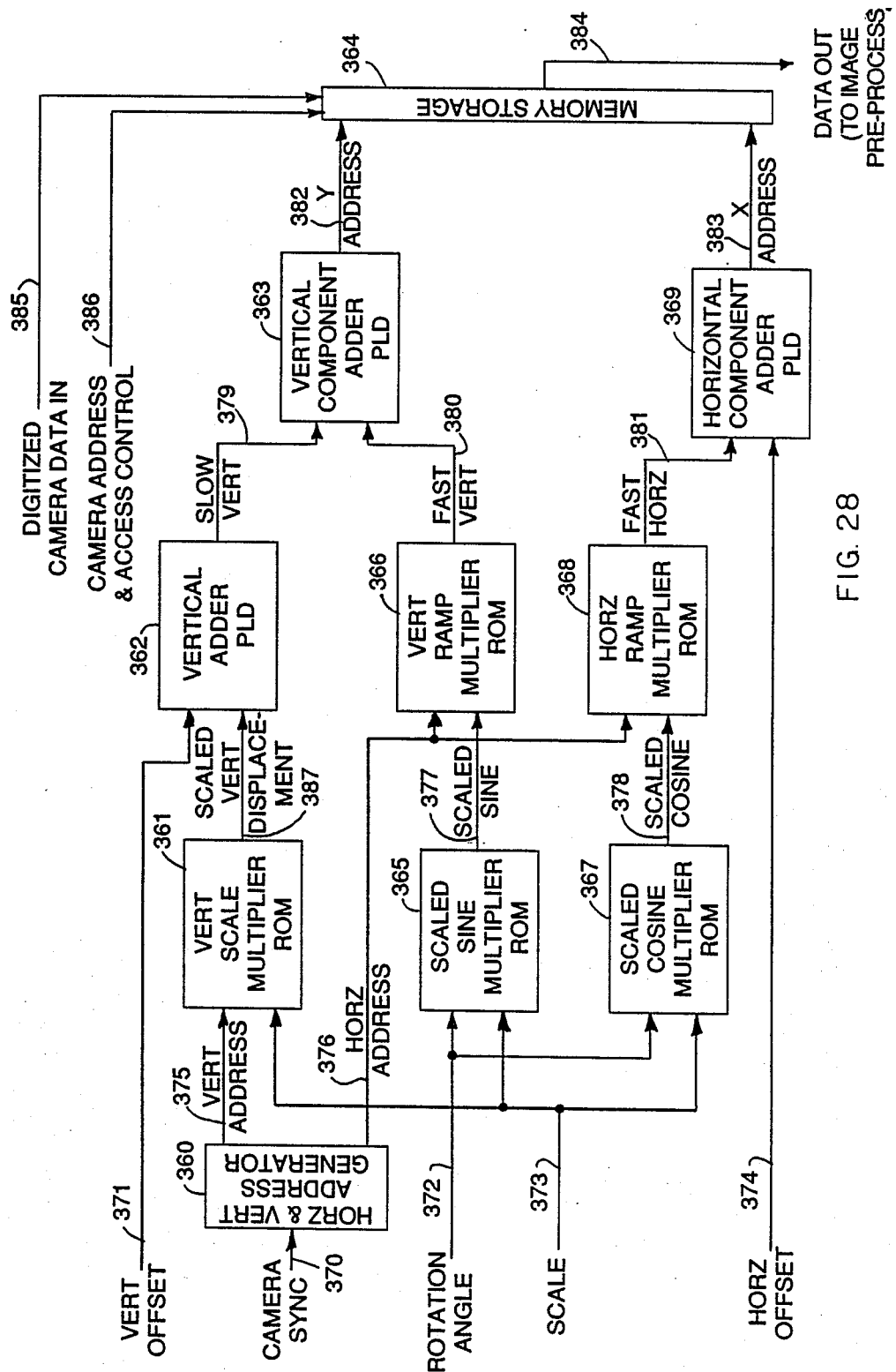
FIG. 28 is a block diagram defining a digital processing approach to magnifying and rotating an image from a camera.

An alternative design to the camera modification described by FIG. 17, for providing magnification, aiming, and rotation of an image, is defined by FIG. 28. FIG. 28 illustrates a data processing technique which accepts digitized camera data 385 and camera data address 386, relating to the viewing position within the image, and stores this data into memory storage 364 (organized in an X-Y matrix). This data development technique is common in the state of the art cameras and will not be discussed herein. Cameras capable of 1024 × 1024 digitized pixel resolution are presently available. Memory storage 364 is also accessible by X address 383 and Y address 382 which are capable of random access addressing of a single pixel data. The address generation circuitry of FIG. 28 describes this X-Y addressing. The input camera controls from a remote computer are in accordance with FIG. 18. Vert offset 371 is connected to the computer 265 vertical location output. Horz offset 374 is connected to the computer 265 horizontal location output. Scale 373 is connected to the computer 265 magnification factor output. Rotation angle 372 is connected to the computer 265 rotation output. Camera sync 370 synchronizes the development of addresses equivalent to camera address 386 at horz and vert address generator 360 to develop vert address 375 and horz address 376. Horz and vert address generator 360 would not be necessary when camera address 386 inputs are accessible. Vert scale multiplier ROM 361 accepts vert address 375 and scale 373 to produce a scaled vert displacement 387. Vertical adder PLD 362 adds scaled vert displacement 387 and vert offset 371 to produce slow vert 379 output (the vertical address without a rotational component). Scaled sine multiplier ROM 365 accepts rotation angle 372 and scale 373 to produce a scaled sine 377 output. Vert ramp multiplier ROM 366 multiplies scaled sine 377 and horz addr 376 to produce fast vert 380 output (the rotational component of the vertical address which is a function of horizontal position). Vertical component adder PLD 363 adds fast vert 380 and slow vert 379 to produce Y address 382. Scaled cosine multiplier ROM 367 multiplies rotation angle 372 and scale 373 to produce scaled cosine 378. Horz ramp multiplier ROM 368 multiplies scaled cosine 378 and horz addr 376 to produce fast horz 381. Horizontal component adder PLD 369 adds fast horz 381 and horz offset 374 to produce X address 383. Data out 384 is output to the image preprocessor for follow-on data processing. If the image preprocessor is not located within the camera circuitry or closely adjacent, a transmission line communication link would be required.

While there have been described above the principles of this invention in connection with specific apparatus, it is to be clearly understood that this description is made only by way of example and not as a limitation in the scope of the invention. The camera used in this disclosure was of the vidicon tube type. Other known technologies do not presently provide comparable resolution; however, other technologies, such as solid state devices, would appear to have the potential to be useful as the state of the art improves. Other camera scanning patterns could be used to achieve the same results. The image pre-processor could be constructed having greater resolution by the use of higher speed semiconductor technology and Parallel path circuitry. Various sample comparison spans, or even computer controlled variable spans, could be used. More computer control elements could be used to develop an image, such as separate amplification of d.c. offset and a.c. gain to the video signal. The output data format, for intersect type data, could be sorted to remove all null conditions and transmit address data with the non-null data. The image pre-processing circuitry could be integrated into the camera package with all communications, to and from the computer, accomplished through the fiber optic links. The image pre-processor could also be integrated into a computer. The image pre-processor could be used to process color data or multiplexed inputs with the provisions already provided by the mode data.

What is claimed is:

1. Apparatus for processing image data to condense the data to a smaller amount of data, the apparatus comprising:
    means for receiving data from an image data generator;
    means for comparing data from two spatially related regions of the image spaced apart by more than one region and for generating an output based upon that comparison, the output having a first state and a second state;
    means for responding to the output of the comparing means for causing at least part of the data from the spatially related regions of the image to be discarded in response to the first state of the output and for causing at least part of the data from the spatially related regions of the image not to be discarded in response to the second state of the output;
    means for coupling the means for comparing data from spatially related regions and for generating an output to the means for receiving data; and
    means for coupling the means for responding to the output of the comparing means to the comparing means.

2. Apparatus according to claim 1 wherein the means for receiving data from an image data generator comprises means for conditioning data received from an image data generator.

3. Apparatus according to claim 2 wherein the means for conditioning data received from an image data generator comprises an analog-to-digital (A/D) converter.

4. Apparatus according to claim 1 wherein the regions are pixels and the means for comparing data from spatially related regions of the image comprises means for comparing data from pixels separated by an integral number of pixels greater than or equal to one.

5. Apparatus according to claim 4 wherein the pixels together form the image having first and second dimensions and the means for comparing data from spatially related regions of the image comprises means for comparing data from pixels separated by an integral number of pixels greater than or equal to one in the first dimension.

6. Apparatus according to claim 5 wherein the means for comparing data from spatially related regions of the image comprises means for comparing data from pixels separated by an integral number of pixels greater than or equal to one in the second dimension.

7. Apparatus according to claim 1 wherein the means for comparing data from spatially related regions of the image and for generating an output based upon that comparison comprises means for generating an output when the compared data evidences a light-to-dark transition.

8. Apparatus according to claim 7 wherein the means for comparing data from spatially related regions of the image and for generating an output based upon that comparison comprises means for generating an output when the compared data evidences a dark-to-light transition.

9. Apparatus according to claim 1 wherein the means for comparing data from spatially related regions of the image and for generating an output based upon that comparison comprises means for generating an output when the compared data evidences a dark-to-light transition.

10. Apparatus according to claim 1 and further comprising means for storing data and for permitting retrieval of stored data; and
    means for coupling the means for storing data and permitting retrieval of stored data to the means for responding to the output of the comparing means;
    the means for responding to the output of the output of the comparing means for causing at least part of the data from the spatially related regions of the image to be stored in the means for storing data in response to the second state of the output.

11. An apparatus for processing image data to condense the data to a smaller amount of data, the apparatus comprising:
    means for receiving data from an image data generator;
    means for comparing data from spatially related pixels of the image and for generating an output based upon that comparison, the output having a first state and a second state, the means for comparing data from spatially related pixels comprising means for comparing data from pixels separated by an interval of seven pixels;
    means for responding to the output of the comparing means for causing at least part of the data from the spatially related pixels of the image to be discarded in response to the first state of the output and for causing at least part of the data from the spatially related pixels of the image not to be discarded in response to the second state of the output;
    means for coupling the means for comparing data from spatially related pixels and for generating an output to the means for receiving data; and
    means for coupling the means for responding to the output of the comparing means to the comparing means.

12. Apparatus according to claim 1 wherein the comparing means compares the intensity difference between the two spatially related regions to a predetermined threshold level, the output generating means providing the first state output when the difference is smaller than the predetermined threshold level and providing the second stat output when the difference is larger than the predetermined threshold level to provide an indication of a contrast between the two spatially related regions.

13. Apparatus according to claim 12 wherein a first predetermined number of comparisons by the comparing means provides a comparison span and the means for responding to the output of the comparing means provides a boundary indication only when a second predetermined number of contrast indications smaller than the first predetermined number occurs within the comparison span.

14. Apparatus according to claim 13 wherein the first predetermined number of comparisons in the comparisons span is equal to seven, and the second predetermined number of contrast indications is equal to four, so that upon the first occurrence of four indications of contrast out of seven consecutive samples, a boundary indication will be generated by the responding means.

* * * * *